(12) United States Patent
Kitagawa et al.

(10) Patent No.: US 11,511,262 B2
(45) Date of Patent: Nov. 29, 2022

(54) ANISOTROPIC NANOSTRUCTURE, PRODUCTION METHOD THEREFOR, AND CATALYST

(71) Applicant: KYOTO UNIVERSITY, Kyoto (JP)

(72) Inventors: Hiroshi Kitagawa, Kyoto (JP); Dongshuang Wu, Kyoto (JP); Kohei Kusada, Kyoto (JP)

(73) Assignee: KYOTO UNIVERSITY, Kyoto (JP)

( * ) Notice: Subject to any disclaimer, the term of this patent is extended or adjusted under 35 U.S.C. 154(b) by 90 days.

(21) Appl. No.: 16/956,309

(22) PCT Filed: Dec. 26, 2018

(86) PCT No.: PCT/JP2018/047807
§ 371 (c)(1),
(2) Date: Jun. 19, 2020

(87) PCT Pub. No.: WO2019/131744
PCT Pub. Date: Jul. 4, 2019

(65) Prior Publication Data
US 2020/0316569 A1 Oct. 8, 2020

(30) Foreign Application Priority Data
Dec. 26, 2017 (JP) .............................. JP2017-249511

(51) Int. Cl.
| | | |
|---|---|---|
| *B01J 23/46* | (2006.01) | |
| *B01J 23/52* | (2006.01) | |
| *B01J 35/06* | (2006.01) | |
| *B01J 35/04* | (2006.01) | |
| *B01J 35/00* | (2006.01) | |
| *C25B 1/04* | (2021.01) | |
| *B01J 37/03* | (2006.01) | |
| *B01J 37/16* | (2006.01) | |
| *C25B 11/04* | (2021.01) | |
| *B82Y 30/00* | (2011.01) | |
| *B82Y 40/00* | (2011.01) | |

(52) U.S. Cl.
CPC .......... *B01J 23/462* (2013.01); *B01J 23/468* (2013.01); *B01J 23/52* (2013.01); *B01J 35/006* (2013.01); *B01J 35/04* (2013.01); *B01J 35/06* (2013.01); *B01J 37/031* (2013.01); *B01J 37/16* (2013.01); *C25B 1/04* (2013.01); *C25B 11/04* (2013.01); *B82Y 30/00* (2013.01); *B82Y 40/00* (2013.01)

(58) Field of Classification Search
CPC ........ B01J 23/468; B01J 23/452; B01J 23/52; B01J 35/006
See application file for complete search history.

(56) References Cited

U.S. PATENT DOCUMENTS

| | | | |
|---|---|---|---|
| 9,452,417 B2 | 9/2016 | Kitagawa et al. | |
| 9,962,683 B2 * | 5/2018 | Kitagawa | .................. F01N 3/10 |
| 10,639,723 B2 | 5/2020 | Kitagawa et al. | |
| 2015/0231605 A1 | 8/2015 | Kitagawa et al. | |
| 2017/0259247 A1 | 9/2017 | Kitagawa et al. | |
| 2018/0331371 A1 | 11/2018 | Sugimoto et al. | |
| 2020/0001370 A1 | 1/2020 | Kitagawa et al. | |

FOREIGN PATENT DOCUMENTS

| | | |
|---|---|---|
| JP | 5737699 B | 5/2015 |
| JP | 2016-160478 A | 9/2016 |
| JP | 2016-204746 A | 12/2016 |
| JP | 2017-127799 A | 7/2017 |
| WO | 2016/039361 A1 | 3/2016 |
| WO | 2017/150596 A1 | 9/2017 |
| WO | WO-2018094321 A * | 5/2018 ............ B01J 23/468 |

OTHER PUBLICATIONS

International Search Report dated Feb. 26, 2019 for International Patent Application No. PCT/JP2018/047807, 3 pages with English translation.
Zhang et al., "Iridium nanoparticles anchored on 3D graphite foam as a bifunctional electrocatalyst for excellent overall water splitting in acidic solution", Nano Energy, 2017, vol. 40, pp. 27-33.
Fu et al., "Colloidal synthesis of iridium-iron nanoparticles for electrocatalytic oxygen evolution", Sustainable Energy Fuels, 2017, vol. 1, pp. 1199-1203.
Pi et al., "Ultrathin Laminar Ir Superstructure as Highly Efficient Oxygen Evolution Electrocatalyst in Broad pH Range", Nano Letters, 2016, vol. 16, pp. 4424-4430.
Lettenmeier et al., "Nanosized IrOx-Ir Catalyst with Relevant Activity for Anodes of Proton Exchange Membrane Electrolysis Produced bya Cost-Effective Procedure", Angew. Chem. Int. Ed., 2016, vol. 55, pp. 742-746.
Nong et al., "Oxide-Supported IrNiOx Core-Shell Particles as Efficient, Cost-Effective, and Stable Catalysts for Electrochemical Water Splitting", Angew. Chem. Int. Ed., 2015, vol. 54, pp. 2975-2979.
Kim et al., "High-Performance Pyrochlore-Type Yttrium Ruthenate Electrocatalyst for Oxygen Evolution Reaction in Acidic Media", Journal of the American Chemical Society, 2017, vol. 139, pp. 12076-12083.

(Continued)

*Primary Examiner* — Yong L Chu
(74) *Attorney, Agent, or Firm* — MH2 Technology Law Group, LLP

(57) ABSTRACT

This invention provides an anisotropic nanostructure represented by the formula:

$$Ru_xM_{1-x},$$

wherein $0.6 \leq x \leq 0.999$, and M represents at least one member selected from the group consisting of Ir, Rh, Pt, Pd, and Au, and wherein Ru and M form a solid solution at the atomic level, and the anisotropic nanostructure has an anisotropic hexagonal close-packed structure (hcp).

17 Claims, 26 Drawing Sheets

(56) References Cited

OTHER PUBLICATIONS

Bhowmik et al., "Growth of One-Dimensional RuO2 Nanowires on g-Carbon Nitride: An Active and Stable Bifunctional Electrocatalyst for Hydrogen and Oxygen Evolution Reactions at All pH Values", ACS Applied Materials and Interfaces, 2016, vol. 8, pp. 28678-28688.

Kong et al., "Free-Standing Two-Dimensional Ru Nanosheets with High Activity toward Water Splitting14", ACS Catalysis, 2016, vol. 6, pp. 1487-1492.

Seitz et al., "A highly active and stable IrOx/SrIrO3 catalyst for the oxygen evolution reaction", Science, 2016, vol. 353, Issue 6303, pp. 1011-1014.

* cited by examiner

Diffraction peak derived from fcc appears as the amount of Ir increases.

ANISOTROPIC NANOSTRUCTURE, PRODUCTION METHOD THEREFOR, AND CATALYST

CROSS-REFERENCE TO RELATED APPLICATIONS

This application is a U.S. National Stage application of PCT/JP2018/047807 filed 26 Dec. 2018, which claims priority to Japanese Application No. 2017-249511 filed 26 Dec. 2017, the entire disclosures of which are incorporated herein by reference.

TECHNICAL FIELD

The present invention relates to an anisotropic nanostructure, a method for producing the anisotropic nanostructure, and a catalyst.

BACKGROUND ART

Although Ir catalysts are known to have a high catalytic activity for oxygen evolution reactions (OERs) (Non-patent Literature (NPL) 1 to 5), an overpotential of 250 mV or more is required.

RuOx is a catalyst with a high OER activity. In acidic solutions, however, its activity drops sharply. Although NPL 6 reports $Y_2Ru_2O_{7-\delta}$ as an Ru-based OER catalyst, its activity at 1 mA cm$^{-2}$ is retained for only 8 hours.

NPL 7 reports $Ru_2$-CNx as a catalyst that is active both for OERs and hydrogen evolution reactions (HERs) in acidic solutions; however, an overpotential of 250 mV is required for OERs, and its HER activity is inferior to that of the commercially available Pt/C.

NPL 8 discloses nanosheet-type Ru based on a solvothermal method, and nanosheet-type $RuO_2$ obtained by oxidizing the nanosheet-type Ru in air; however, both of these have low HER and OER activities.

NPL 9 discloses an oxygen evolution reaction (OER) catalyst of $IrO_x/SrIrO_3$ in an acidic solution. However, an overpotential of 270 mV is required to achieve 10 mA/cm$^2$ oxide.

Patent Literature (PTL) 1 discloses Pd—Ru solid solution alloy nanoparticles; however, PTL 1 nowhere discloses an anisotropic crystal structure.

PTL 2 discloses a Pd—Ru alloy electrode material. In the Examples, the material is produced at a reaction temperature of 200° C., and FIG. 6 shows its poor durability.

CITATION LIST

Patent Literature

PTL 1: JP5737699B
PTL 2: JP2016-160478A

Non-Patent Literature

NPL 1: J. Zhang, et al., Nano Energy, 40, 27-33 (2017).
NPL 2: L. Fu, et al., Sustainable Energy Fuels, 1, 1199-1203, (2017)
NPL 3: Y. Pi, et al., Nano Lett., 16, 4424-4430, (2016)
NPL 4: P. Lettenmeier, Angew. Chem. Int. Ed., 55, 742-746, (2016)
NPL 5: H. N. Nong, Angew. Chem. Int. Ed. Engl., 54, 2975-2979, (2015)
NPL 6: J. Kim et al., J. Am. Chem. Soc., 139, 12076-12083, (2017)
NPL 7: T. Bhowmik, et al., ACS Appl. Mater. Interfaces, 8, 28678-28688, (2016)
NPL 8: X. Kong, et al., ACS Catal., 6, 1487-1492, (2016)
NPL 9: L. C. Seitz, et al., Science, 353, 1011-1014, (2016)

SUMMARY OF INVENTION

Technical Problem

An object of the present invention is to provide a novel, highly active and highly durable material with oxygen evolution reaction (OER) and hydrogen evolution reaction (HER) catalytic activities.

Solution to Problem

The present invention provides the following anisotropic nanostructure, production method for the anisotropic nanostructure, and catalyst.

Item 1. An anisotropic nanostructure represented by the formula:

$$Ru_xM_{1-x},$$

wherein $0.6 \leq x \leq 0.999$, and M represents at least one member selected from the group consisting of Ir, Rh, Pt, Pd, and Au, and wherein Ru and M form a solid solution at the atomic level, and the anisotropic nanostructure has an anisotropic hexagonal close-packed structure (hcp).

Item 2. The anisotropic nanostructure according to Item 1, having a two-dimensional sheet structure comprising a stack of nanosheets or nanoplates with 0001 planes exposed as a main plane.

Item 3. The anisotropic nanostructure according to Item 1 or 2, wherein the anisotropic nanostructure having an anisotropic hexagonal close-packed structure satisfies the relationship of Formula (I):

$$Z/Y \geq 1.5 \tag{I},$$

wherein Y represents a crystallite size calculated from the 10-11 peak in X-ray diffraction pattern, and Z represents a crystallite size calculated from the 11-20 peak.

Item 4. The anisotropic nanostructure according to Item 3, wherein the anisotropic nanostructure having an anisotropic hexagonal close-packed structure satisfies the relationship of Formula (Ia):

$$Z/Y \geq 2.5 \tag{Ia},$$

wherein Y represents a crystallite size calculated from the 10-11 peak in X-ray diffraction pattern, and Z represents a crystallite size calculated from the 11-20 peak.

Item 5. The anisotropic nanostructure according to Item 3, wherein the anisotropic nanostructure having an anisotropic hexagonal close-packed structure satisfies the relationship of Formula (Ib):

$$Z/Y \geq 3 \tag{Ib},$$

wherein Y represents a crystallite size calculated from the 10-11 peak in X-ray diffraction pattern, and Z represents a crystallite size calculated from the 11-20 peak.

Item 6. The anisotropic nanostructure according to any one of Items 1 to 5, wherein the exposure percentage of the 0001 planes in the total surface area is 60 to 99%.

Item 7. The anisotropic nanostructure according to any one of Items 1 to 6, wherein the nanosheets or nanoplates constituting the anisotropic nanostructure and having the 0001 planes exposed as the main plane have a thickness of 0.2 to 20 nm.

Item 8. The anisotropic nanostructure according to any one of Items 1 to 7, wherein M is Ir.

Item 9. The anisotropic nanostructure according to any one of Items 1 to 8, wherein $0.8 \leq x \leq 0.995$.

Item 10. The anisotropic nanostructure according to any one of Items 1 to 9, having a dendritic, coral-like, mesh-like, or flower-like shape.

Item 11. A catalyst having the nanostructure of any one of Items 1 to 10.

Item 12. The catalyst according to Item 11, which is an electrode catalyst for oxygen evolution reactions (OERs) or hydrogen evolution reactions (HERs).

Item 13. A method for producing the anisotropic nanostructure of any one of Items 1 to 10, comprising adding a solution containing an Ru compound and an M compound to a solution containing a reducing agent and having a temperature of 215 to 230° C.

Item 14. The method for producing the anisotropic nanostructure according to Item 13, wherein the solution has a total concentration of the Ru compound and the M compound of 0.55 $C_0$ to 2 $C_0$, wherein $C_0$=1 mmol/15 ml.

Item 15. The method for producing the anisotropic nanostructure according to Item 13 or 14, wherein the solution containing the Ru compound and the M compound is added at a rate of 0.5 $r_0$ to 5 $r_0$, wherein $r_0$=1 ml/min.

Advantageous Effects of Invention

The efficiency of solid polymer water electrolysis systems is limited by the performance of OER catalysts. Catalysts with the anisotropic nanostructure disclosed in the present specification are capable of achieving a current density of 10 mA/cm$^2$ with a very low overpotential even in an acidic solution. Ru-based catalysts, which show a high activity, have been known to have extremely low durability. Although the catalyst disclosed in the present specification contains Ru as a main component, this catalyst is capable of achieving even higher durability than conventional, highly durable Ir-based catalysts. Additionally, Ru is inexpensive compared to conventional Ir-based catalysts. Furthermore, the catalyst disclosed in the present specification also shows a high activity for HERs. Since the activity is superior to that of Pt/C, a small amount of the catalyst disclosed in the present specification is effective; thus, cost reduction can be expected in terms of catalyst production.

(a) (a-1) In the nanostructure N—RuIr, the curve of the fourth measurement showed no change from the curve of the first measurement, while (a-2) in the spherical S—RuIr, the rise of the curve shifted to the higher potential side as the number of the measurements increases, indicating a decrease in the activity.

(b) (b-1) In the anisotropic Ru nanostructure, the activity decreased with an increase in the number of the measurements, compared to N—RuIr, while (b-2) in the spherical Ru (Ru NPs), the activity decreased extremely rapidly. (a) and (b) reveal that a high durability was achieved with the effects, i.e., the unique nanostructure and the alloy.

Figure 10:
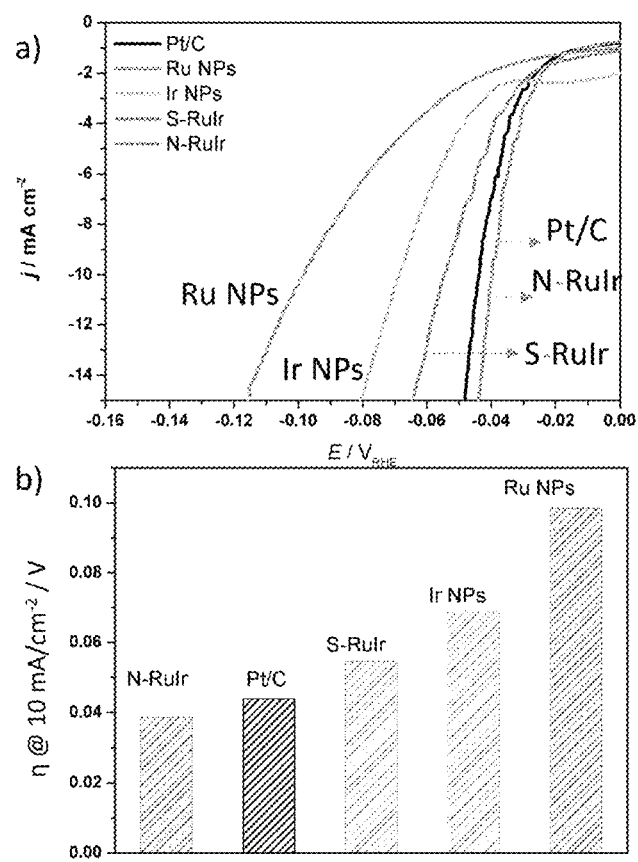

FIG. 10 is graphs showing the HER activity in an acidic aqueous solution. (a): HER polarization curves and (b): overpotential at 10 mA/cm$^2$. Test conditions: Ar-purged 0.05 M H$_2$SO$_4$ solution, 1600 rpm, 5 mV/s. N—RuIr shows a higher HER activity than S—RuIr or metal simple substances (Ru or Ir). The activity of N—RuIr is higher than that of the commercially available Pt/C.

Figure 11:
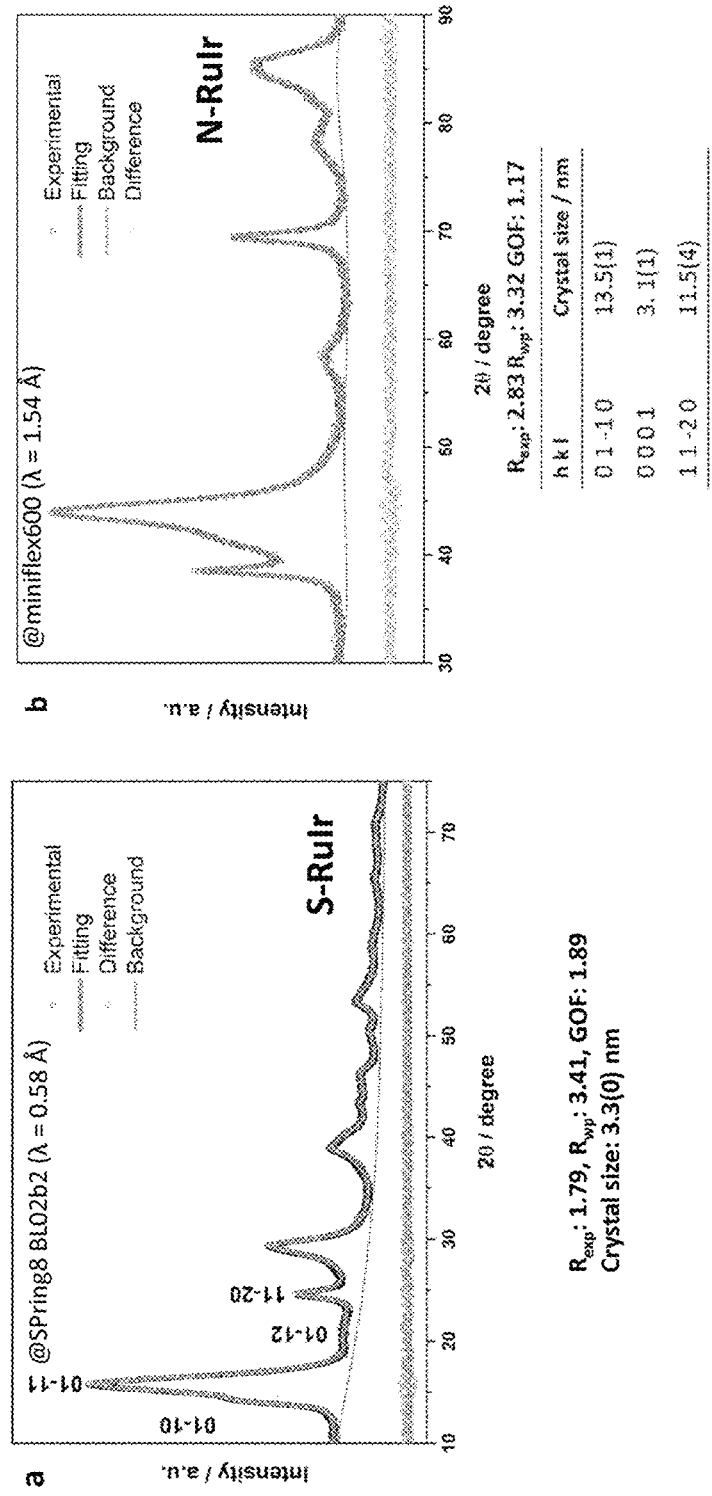

FIG. 11 shows PXRD patterns. (a): S—RuIr and (b): N—RuIr. Black circles are PXRD measurement values, and the red lines are PXRD fitting curves. The profile below the gray triangles represents the difference between the measurement values and the fitting curve, and the light-blue thin line represents the background. S—RuIr has low crystallinity while N—RuIr has high crystallinity at certain crystal orientations due to its anisotropic growth. Better crystallinity and low-dimensional anisotropic growth are assumed to contribute to the stability.

Figure 12:
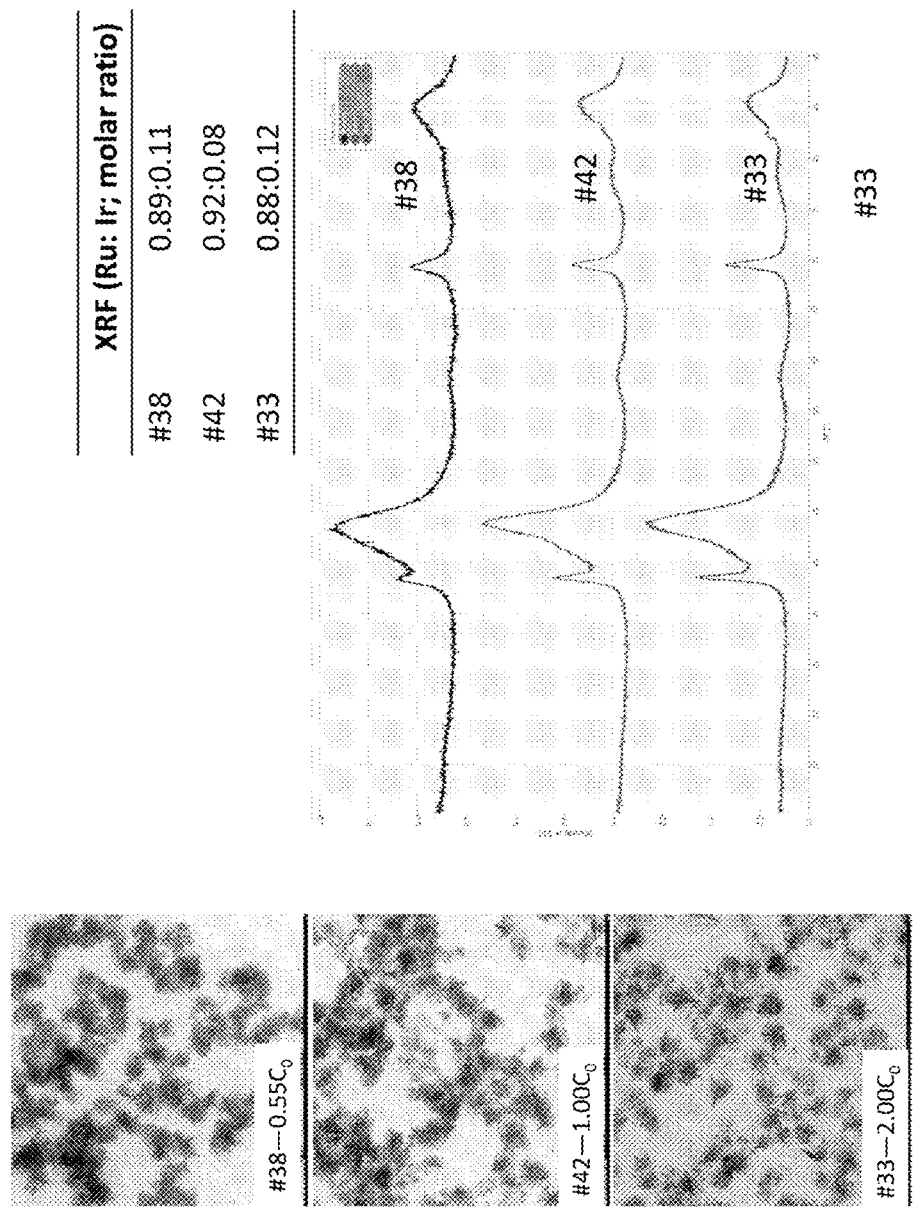

FIG. 12: Synthesis conditions of nanostructures. The concentration of the metal salt solution was varied ($C_0=1$ mmol/15 ml). As the concentration increased, anisotropic growth was further promoted. Synthesis conditions: 230° C., TEG (100 ml), addition rate: 1 ml/min, PVP/Metal=5

Figure 13:
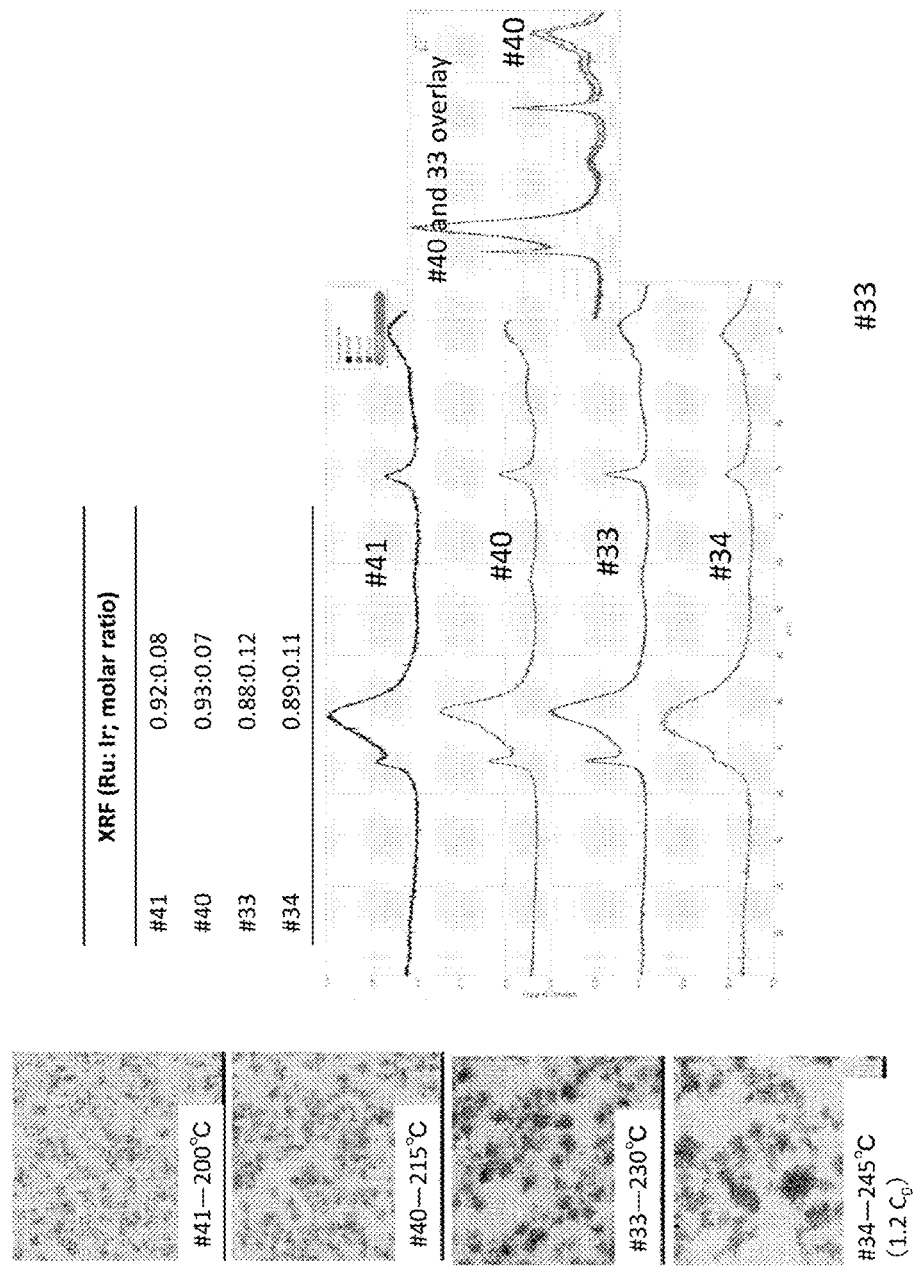

FIG. 13: In the following conditions for synthesis of nanostructures, the average temperature was varied during the synthesis. The results revealed that the temperature of 215 to 230° C. is optimal for anisotropic growth. Synthesis conditions: 2 $C_0$, TEG (100 ml), addition rate (1 ml/min), PVP/Metal=5

Figure 14:
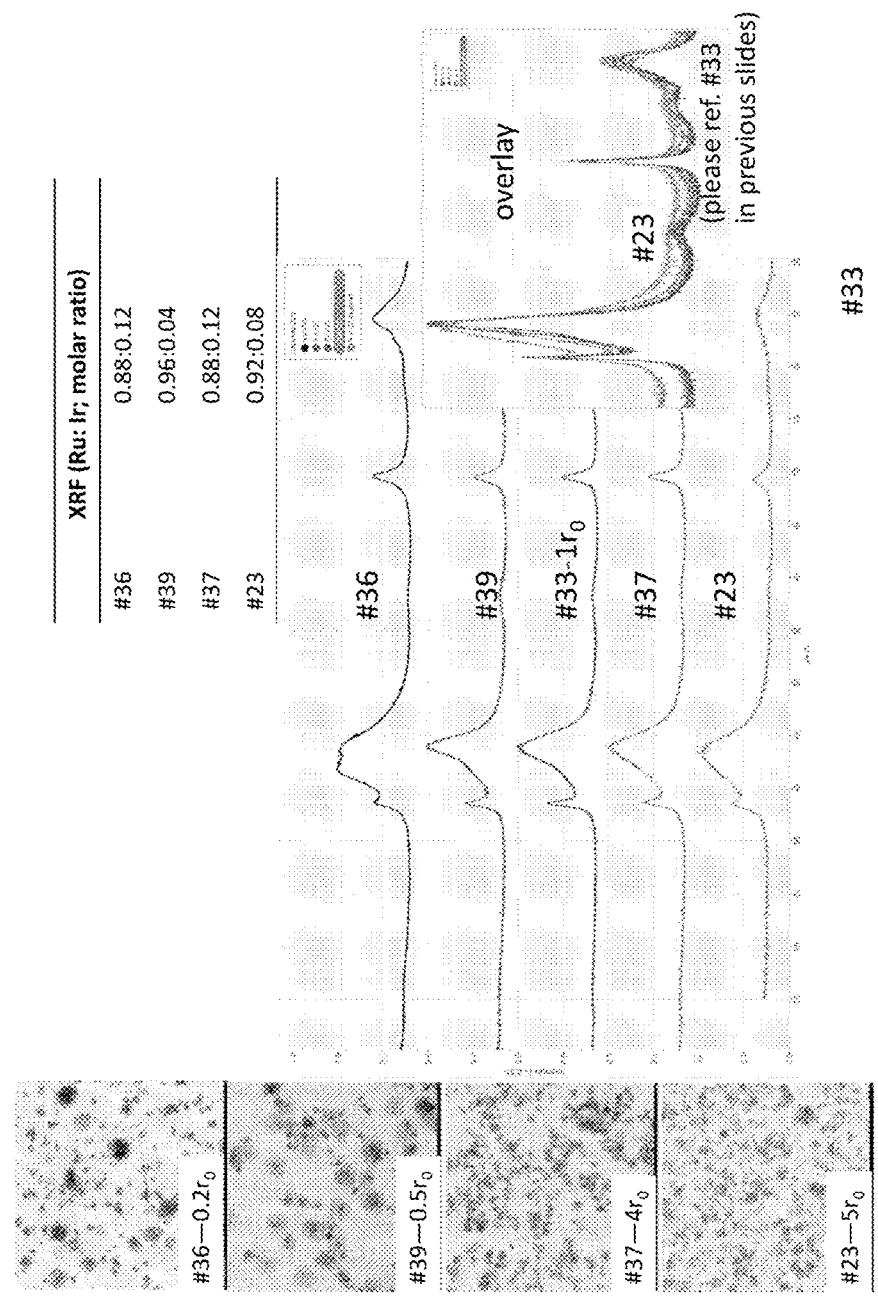

FIG. 14: Synthesis conditions of nanostructures. Effect of the injection rate of the metal salt solution on the synthesis of anisotropically grown RuIr nanostructures ($r_0$=1.00 ml/min). The anisotropic growth occurred at 0.5 $r_0$ to 5 $r_0$, and the crystal size decreased with an increase in the injection rate. Synthesis conditions: 2 $C_0$, TEG (100 ml), 230° C., PVP/Metal=5

Figure 15:
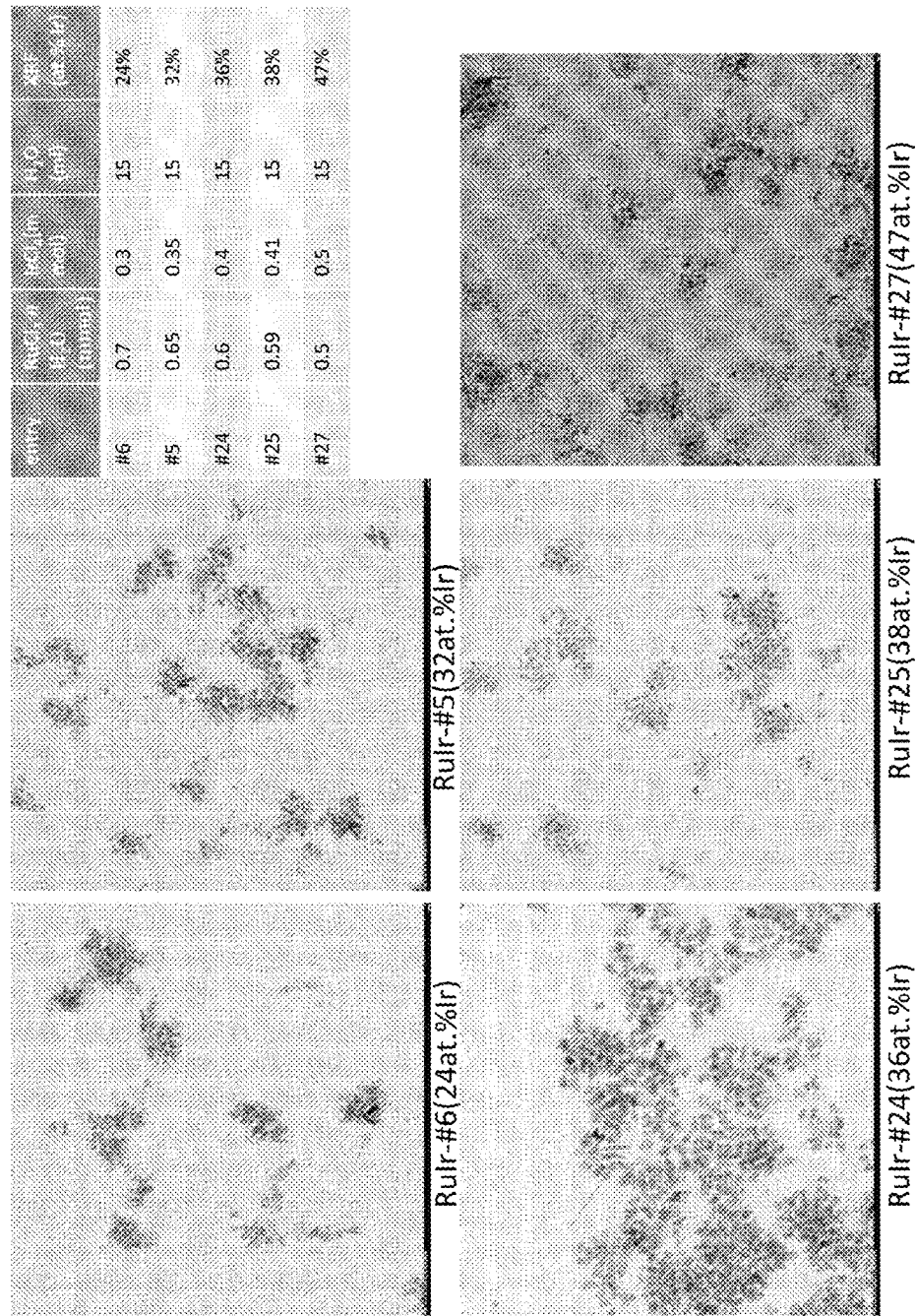

FIG. 15: Effect of the Ir content on the anisotropically grown RuIr nanostructures (TEM images). #6 (24 at. % of Ir), #5 (32 at. % of Ir), #24 (36 at. % of Ir), and #25 (38 at. % of Ir) represent N—RuIr obtained in Example 5. #27(47 at. % of Ir) is S—RuIr obtained in Comparative Example 2. The production conditions are the same as for #39, except that a spray method was used. The particles indicated by arrows shows anisotropic growth.

Figure 16:
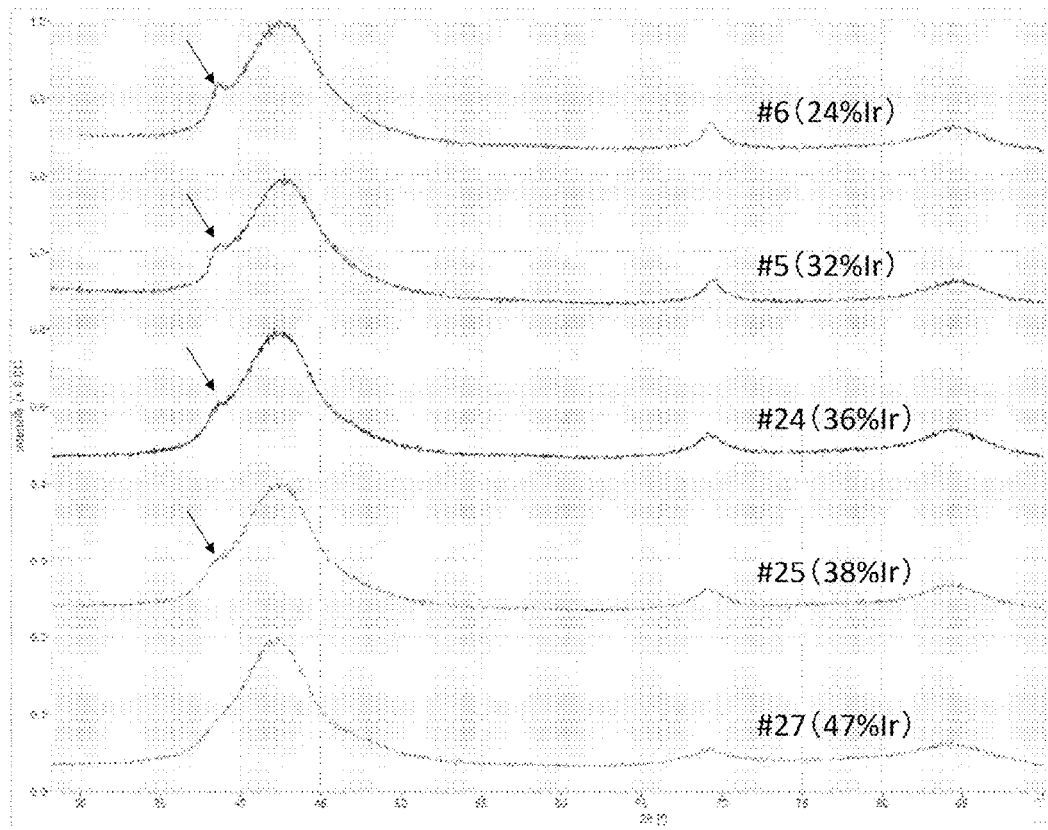

FIG. 16: Effect of the Ir content on anisotropically grown RuIr nanostructures (XRD). The anisotropic growth is not observed when the Ir content exceeded 40 at. %. FIGS. 15 and 16 clarify that the anisotropic growth occurs when the Ir content is greater than 0 at. % and 40 at. % or less. The peaks indicated by arrows suggest that the growth occurs anisotropically.

Figure 17:
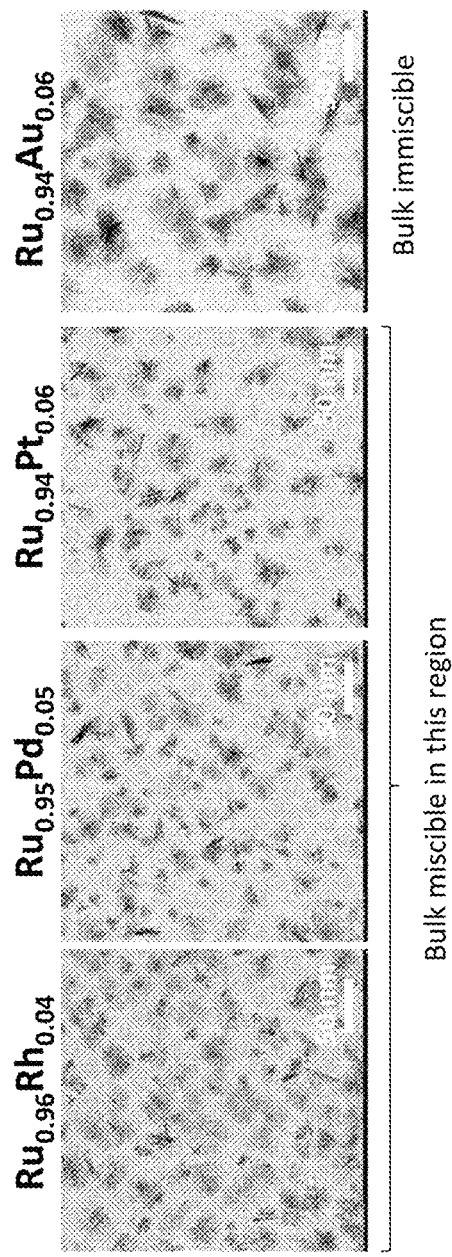

FIG. 17 shows TEM images of anisotropically grown RuPd, RuPt, RuRh, and RuAu nanostructures.

Figure 18:
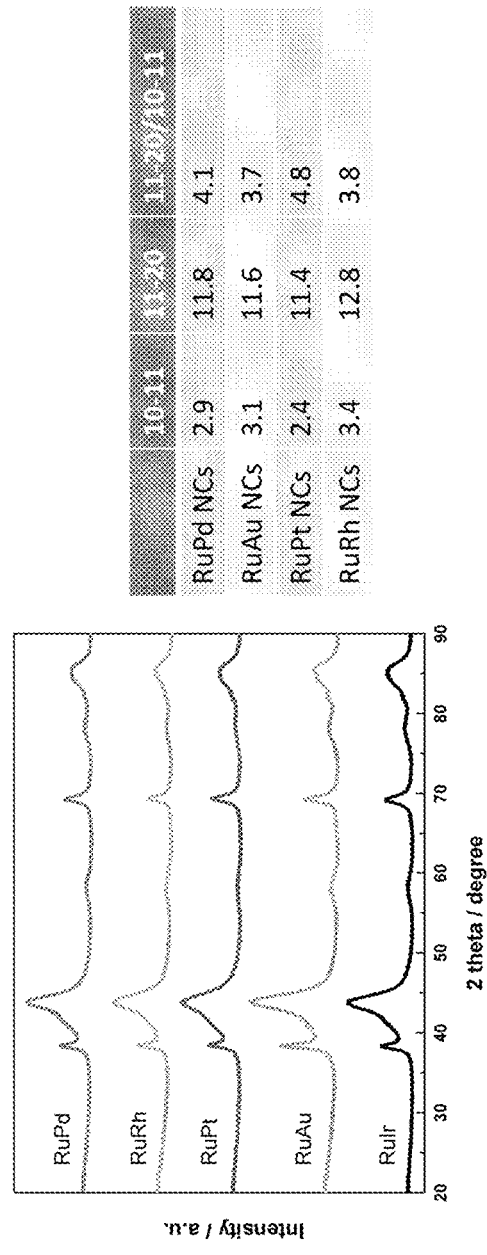

FIG. 18 shows XRD patterns and crystalline size analysis of anisotropically grown RuPd, RuPt, RuRh, and RuAu nanostructures.

Figure 19:
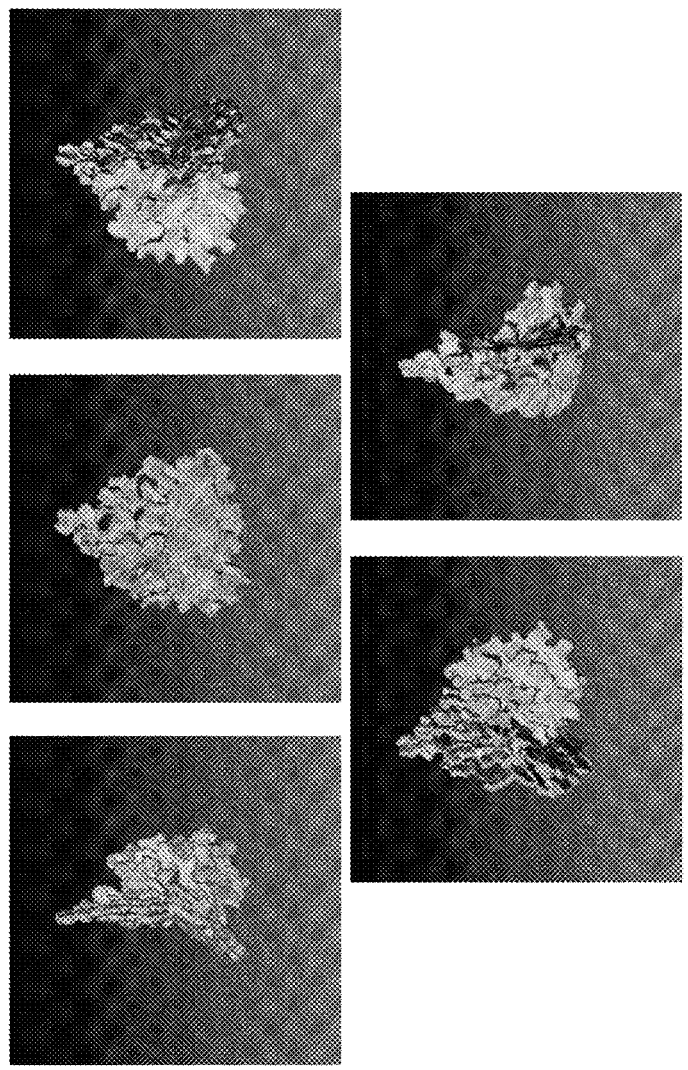

FIG. 19 is 3D tomographic images reconstructed from HAADF-STEM images of the anisotropically grown RuIr nanostructure taken from different angles.

Figure 20:
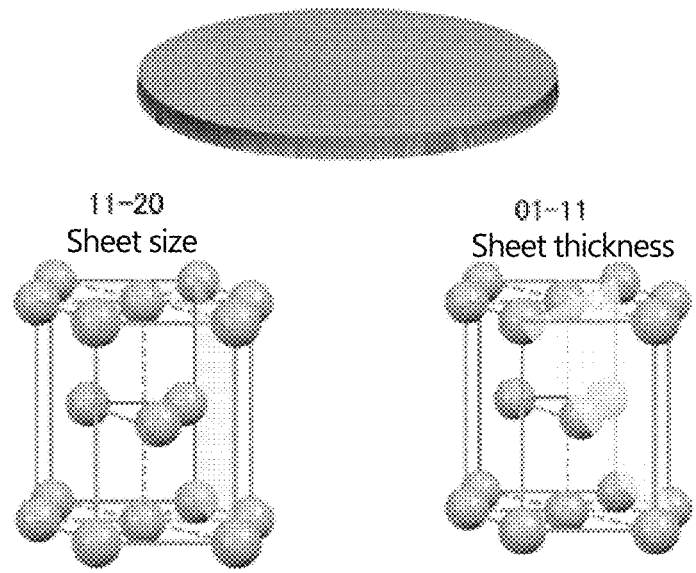

FIG. 20 shows an assumed disk sheet, supposing that the crystallite size of the 11-20 (in-plane direction) obtained from XRD is an average sheet size. From the similarity relationship, the thickness of the disk sheet is $\sqrt{(3/32)} \approx 0.53$ times that of the 10-11. The 10-11 and the 01-11 in FIG. 20 are equivalent planes.

Figure 21:
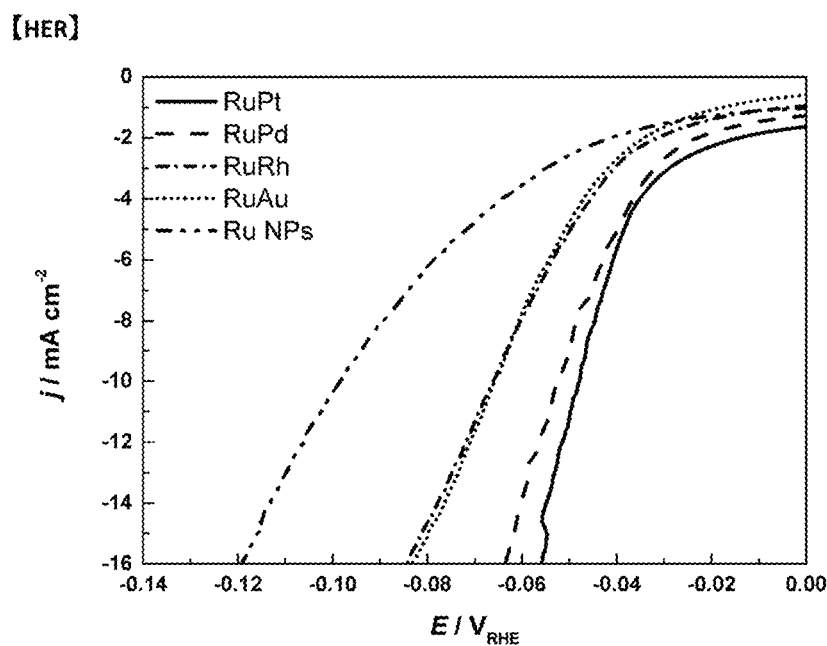

FIG. 21 is a graph showing the HER catalytic activity. The results clarified that a second metal M (even about 5 at. %) significantly enhanced the catalytic activity of the Ru nanoparticles (Ru NPs).

Figure 22:
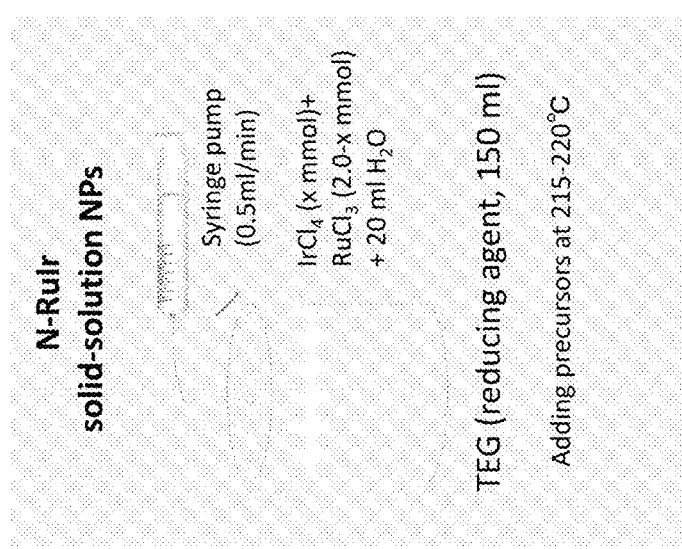

FIG. 22: Synthesis of RuIr NCs with different Ir compositions.

Figure 23:
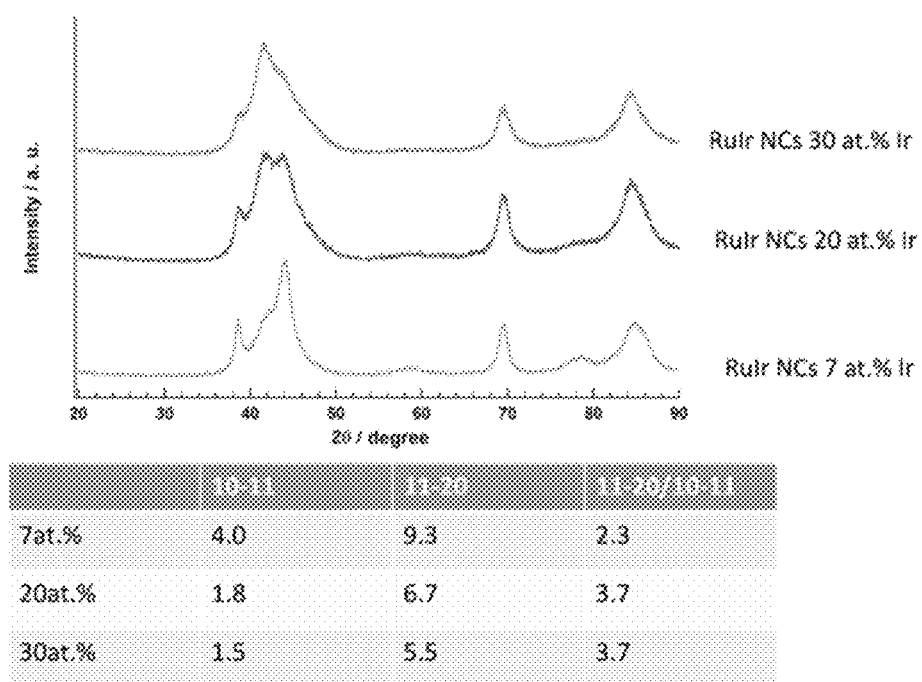

FIG. 23 shows XRD patterns and crystallite size analysis of RuIr nanocorals with different Ir percentages.

Figure 24:
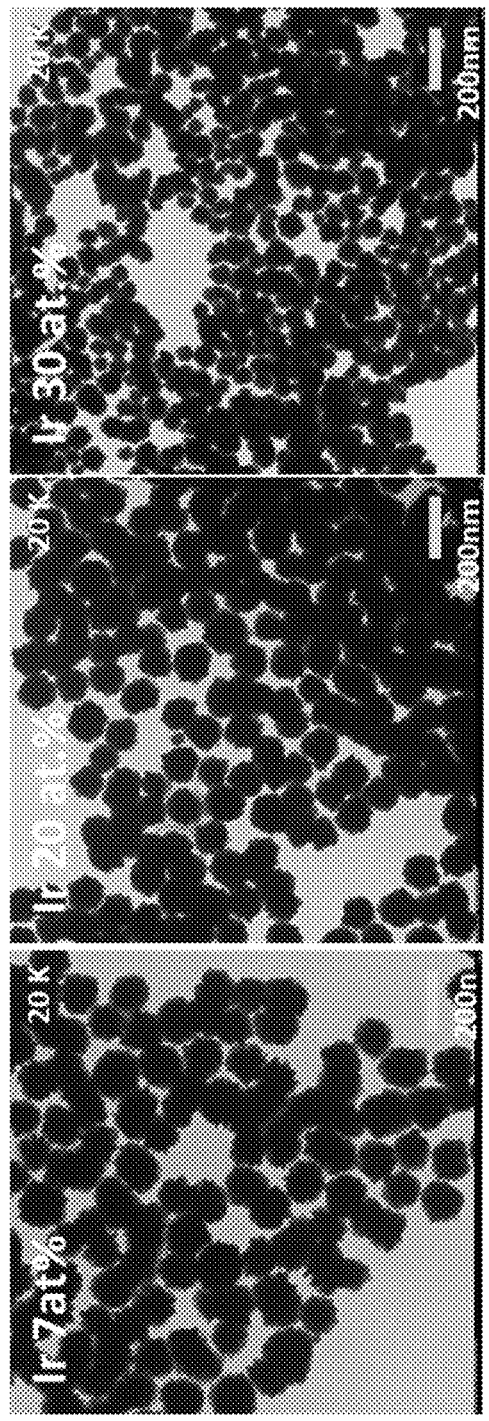

FIG. 24 shows TEM images of RuIr nanocorals synthesized in FIG. 22.

Figure 25:
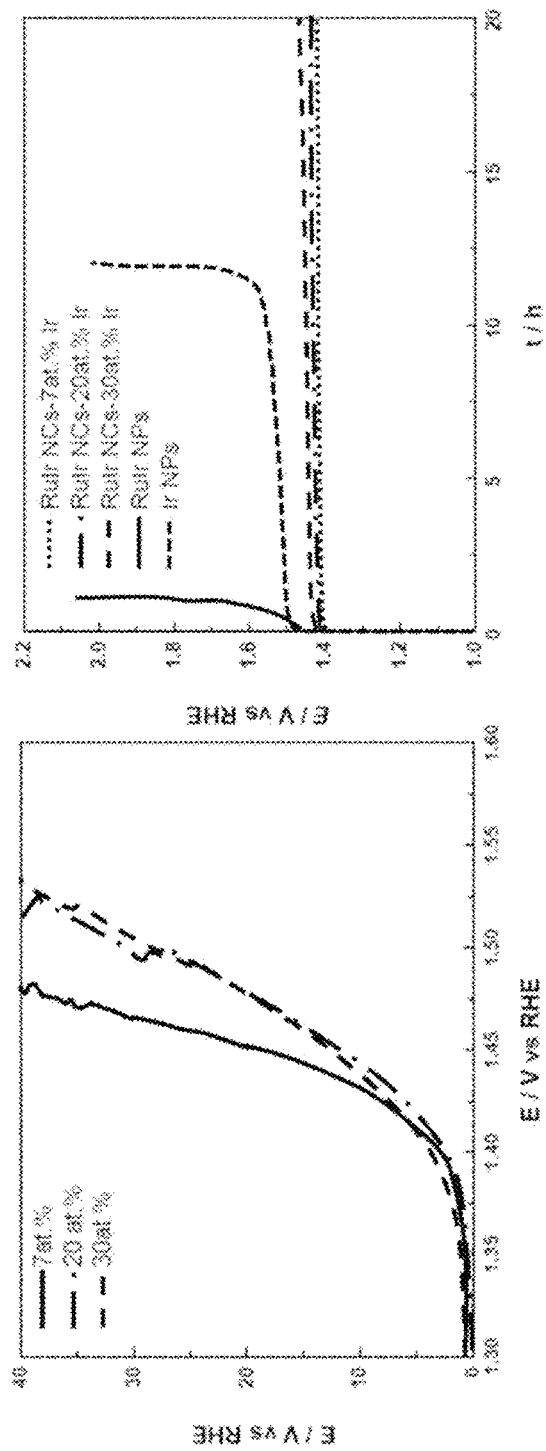

FIG. 25 is graphs showing the OER activity and stability of RuIr nanocorals synthesized in FIG. 22 in an acidic aqueous solution. (a) shows OER polarization curves (test conditions: Ar-purged 0.05 M $H_2SO_4$ solution, 1600 rpm, 5 mV/s), and (b) shows chronopotentiometry curves at a current density of 1 mA/cm². When the amount of Ir is too high, the activity is slightly reduced. The RuIr nanocorals with 30 at. % or less of Ir had higher stability than that of the RuIr spherical particles or Ir nanoparticles.

Figure 26:
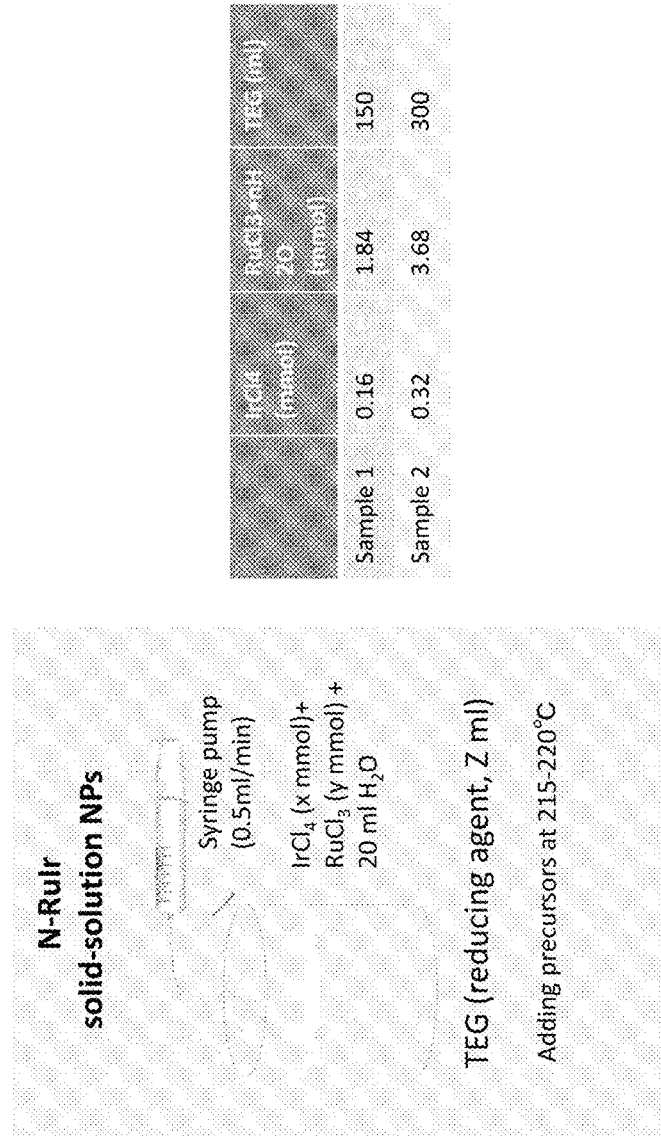

FIG. 26: Synthesis of RuIr catalysts with different anisotropy.

Figure 27:
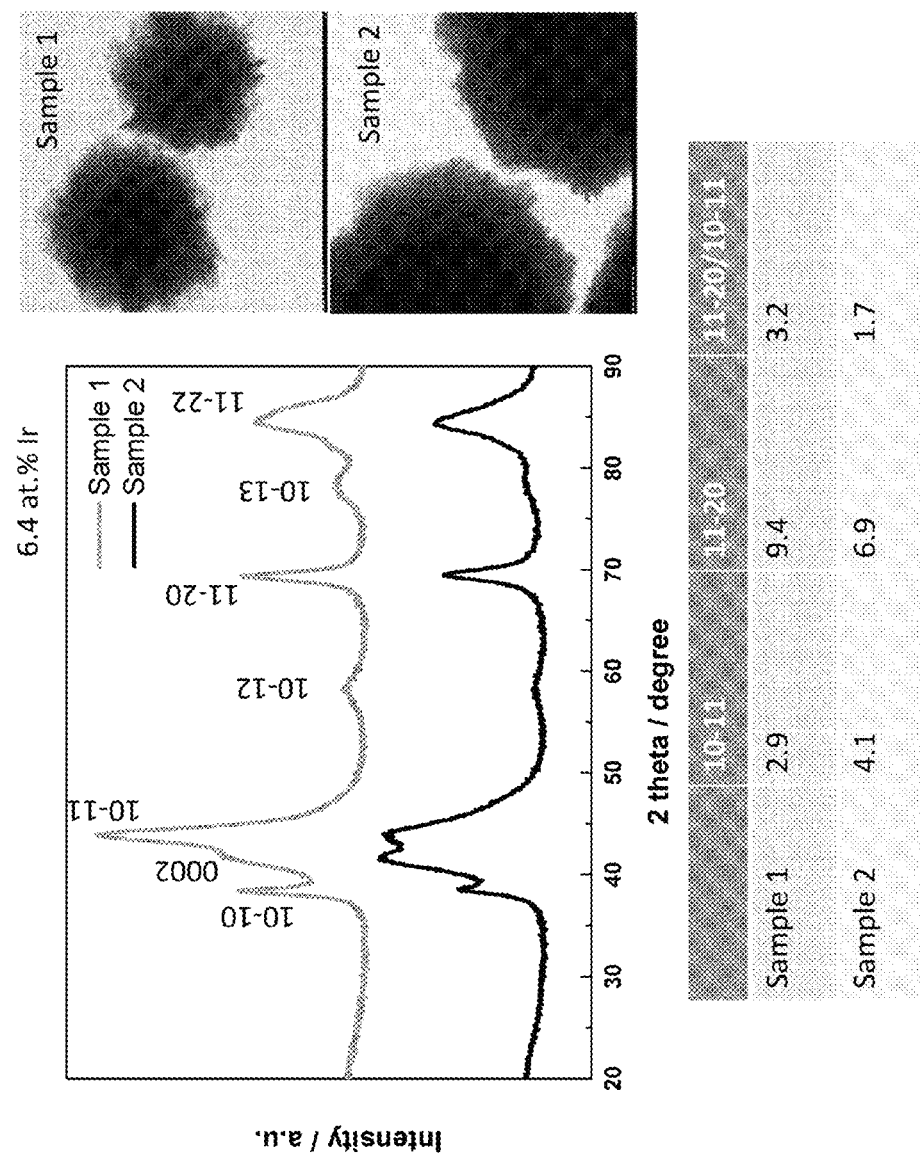

FIG. 27 shows XRD patterns, crystallite sizes, and TEM images of Samples 1 and 2.

Figure 28:
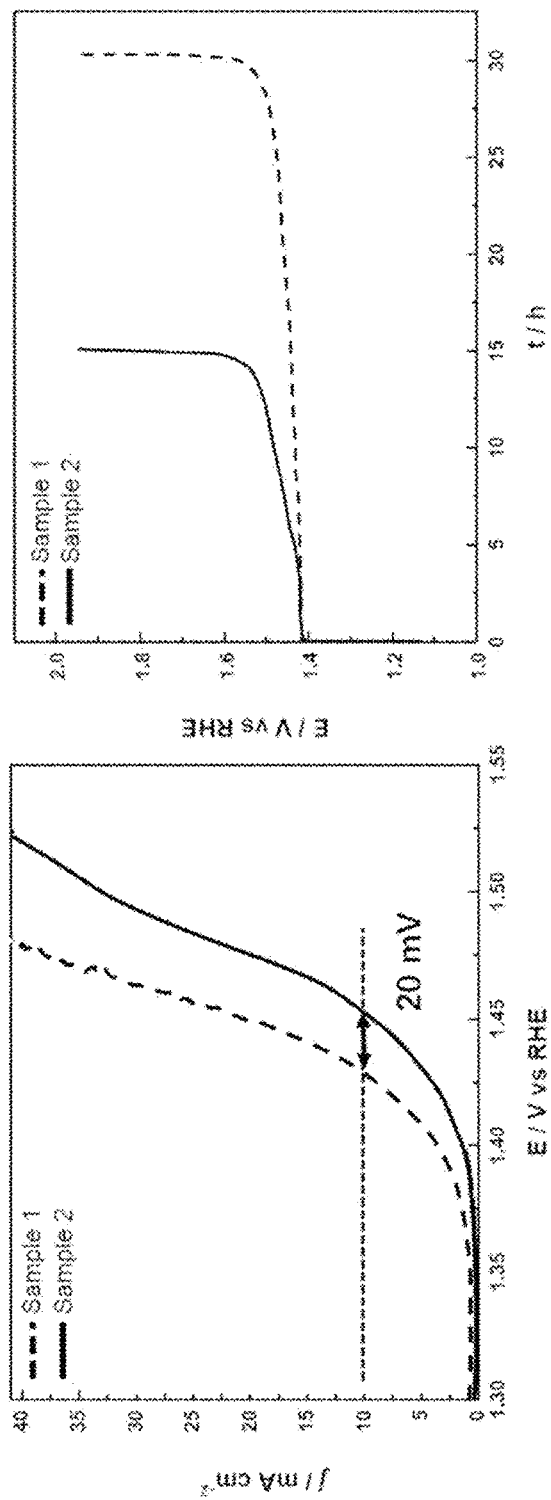

FIG. 28 is graphs showing the OER activity and stability in an acidic aqueous solution. (a) shows OER polarization curves (test condition: Ar-purged 0.05 M $H_2SO_4$ solution, 1600 rpm, 5 mV/s.). (b) shows chronopotentiometry curves at a current density of 1 mA/cm². Sample 1 with high anisotropy has higher activity and higher stability than Sample 2.

DESCRIPTION OF EMBODIMENTS

Figure 6A:
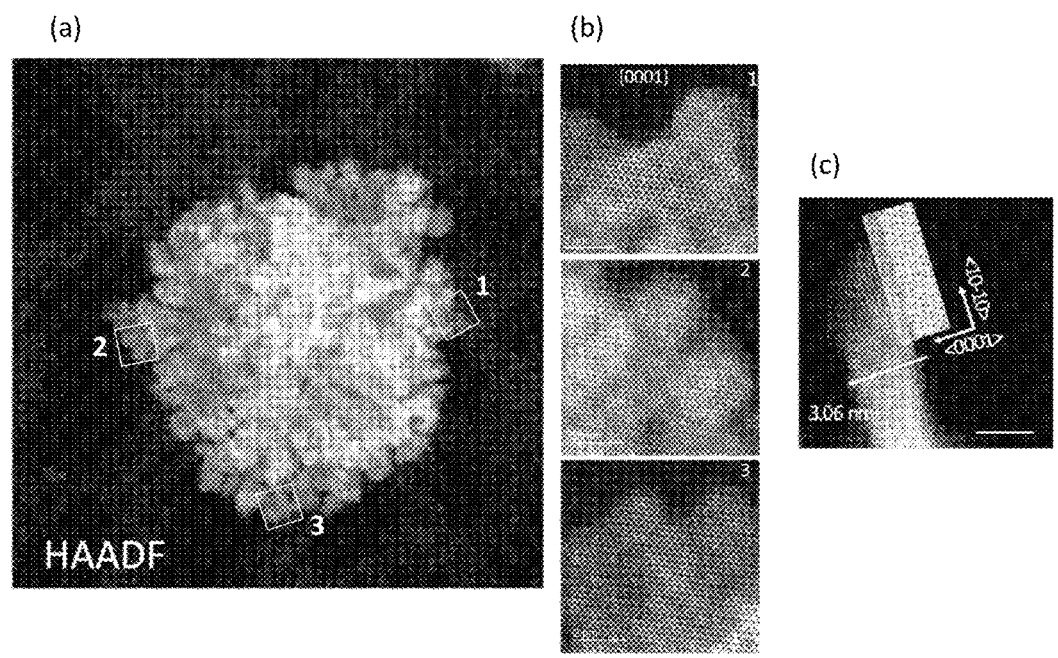
FIG. 6A: (a) is a HAADF-STEM image of N—RuIr, and (b) is enlarged views of squares 1 to 3 in the HADDF image (top). In the enlarged views 1 to 3, the bright atoms are Ir atoms. The Ir atoms are uniformly distributed in the hcp Ru lattice. The nanoflower is confirmed to have a stack of thin sheets with exposed 0001 planes. A hexagonal pattern specific to 0001 planes is observed. Each sheet is confirmed to have a structure in which the 0001 planes serve as the main exposed plane. (c) is a side view of the sheet. It is revealed that the atomic arrangement is consistent with that of the model. The thickness is about 3 nm.

In one preferred embodiment of the present invention, the nanostructure has an anisotropic hexagonal close-packed (hcp) structure as its main structure, and has a solid solution structure with 0001 planes exposed as its main plane. The combination of the anisotropic hexagonal close-packed (hcp) structure and solid solution structure provides an oxygen evolution reaction (OER) catalytic activity and a hydrogen evolution reaction (HER) catalytic activity with high activity and high durability. In this nanostructure, the crystals grow in the direction parallel to the 0001 planes and the direction that widens the 0001 planes. In one preferred embodiment, the nanostructure of the present invention has a two-dimensional sheet structure in which nanosheets or nanoplates are stacked such that the 0001 planes as a constituent element have a greater exposure percentage. The expression "stacked" as used herein means that although the 0001 planes of two adjacent nanosheets or nanoplates overlap over some portion, the proportion of the overlapped portion is relatively small. In one preferred embodiment, the 0001 planes of the nanosheets or nanoplates constituting the nanostructure of the present invention overlap with each other over a small portion, and the exposure percentage of the 0001 planes in the total surface area is high (FIG. 6A, FIG. 19, and FIG. 20). In one preferred embodiment of the present invention, the lower limit of the exposure percentage of the 0001 planes in the total surface area of the anisotropic nanostructure of the present invention is preferably 60% or more, 62% or more, 64% or more, 66% or more, 68% or more, 70% or more, 72% or more, or 74% or more. The upper limit of the exposure percentage of the 0001 planes in the total surface area of the anisotropic nanostructure of the present invention is, but not particularly limited to, for example, 99% or less, 98% or less, 96% or less, 94% or less, 92% or less, 90% or less, 88% or less, 86% or less, 84% or less, or 82% or less.

Figure 6B:
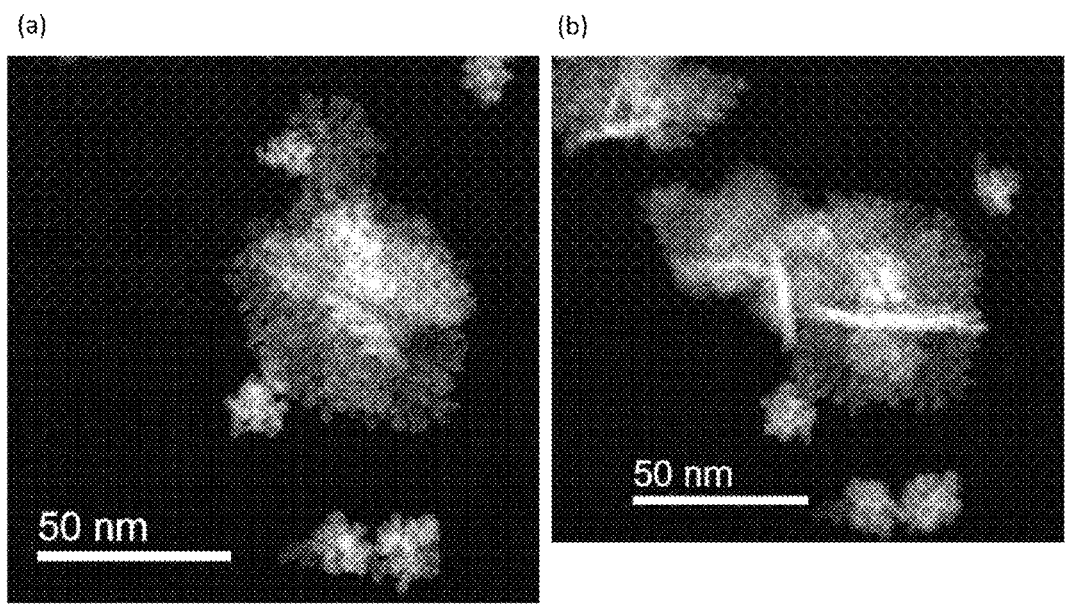
FIG. 6B is HAADF-STEM images of N—RuIr. A comparison of the views of (a) not inclined and (b) inclined 45° shows that the nanostructure of the present invention is composed of multiple planar nanosheets. (b) In the view inclined 45°, the needle-like parts are nanoplates or nanosheets positioned horizontally in the electron beam incident direction.
Figure 6C:
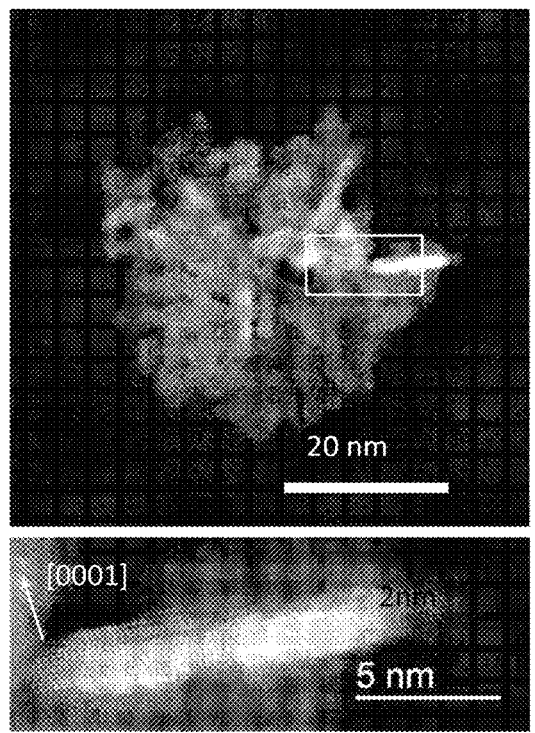
FIG. 6C is HAADF-STEM images of N—RuIr.

In one preferred embodiment of the present invention, the two-dimensional sheet structure has a crystal structure having a length in the out-plane direction of the 0001 planes of preferably 5 nm or less, more preferably 4 nm or less, and still more preferably 3 nm or less, and has a crystal structure having a length in the in-plane direction of the 0001 planes of preferably 5 nm or more, more preferably 7.5 nm or more, and still more preferably 10 nm or more. The upper limit of the length in the in-plane direction of the 0001 planes of the crystal structure is preferably 50 nm or less, more preferably 40 nm or less, and still more preferably 30 nm or less. In the two-dimensional sheet structure, the ratio of the lengths of the crystal structure in the in-plane direction and the out-plane direction of the 0001 planes (the length of the crystal in the in-plane direction of the 0001 planes to the length of the crystal in the out-plane direction of the 0001 planes) is 1.5 to 50, and preferably 2 to 10. The lower image in FIG. 6C shows the crystal structure of nanosheets having a length in the out-plane direction of the 0001 planes of 2 nm. FIG. 6A (c) shows the crystal structure of nanosheets having a length in the out-plane direction of the 0001 planes of 3.06 nm.

The thickness of the nanosheets or nanoplates exposed as the major plane constituting the anisotropic nanostructure is 0.2 to 20 nm, preferably 0.2 to 18 nm, more preferably 0.2 to 15 nm, still more preferably 0.2 to 12 nm, and particularly preferably 0.2 to 10 nm. The thickness of the nanosheets or nanoplates can be estimated from the crystallite size calculated from the 10-11 peak of the nanosheets or nanoplates.

Multiple sheets (the nanosheets or nanoplates) grow to widen the 0001 planes. When the multiple sheets are stacked radially and three-dimensionally, they form a coral-like shape like a ball or flower-like shape (FIG. 6A). When the multiple sheets grow radially and planarly, they form a sheet-like laminate. When multiple sheets face in various directions and are in contact or entangled with each other at the 0001 planes or the side planes, the nanostructure has a shape with many gaps, such as a dendritic shape, a coral-like shape (FIG. 19), and a mesh-like shape. The nanostructure of the present invention includes all of these shapes. In terms of the dendritic shape, the structure can be observed, depending on the direction of the sheet, as a rod-shaped structure with the axis extending in the [01-10] direction by electron microscope observation. FIG. 6B and FIG. 6C show that the nanosheets/nanoplates in a vertical position (when viewed from the direction intersecting the thickness direction of the nanosheets/nanoplates) appear to have a bar-like shape extending in the [01-10] direction. There is no strict difference between the shapes given as examples above, and a single nanostructure can be referred to as having multiple shapes. For example, the nanostructure of FIG. 6A has a nanoflower-like-shape and a nanocoral-like shape. In one particularly preferred embodiment of the present invention, the nanostructure of the present invention has a nanocoral-like shape.

In one preferred embodiment of the present invention, the anisotropic nanostructure with the anisotropic hexagonal close-packed structure satisfies the relationship of Formula (I):

$$Z/Y \geq 1.5 \qquad (I)$$

(In the formula, Y represents a crystallite size calculated from the 10-11 peak in X-ray diffraction pattern, and Z represents a crystallite size calculated from the 11-20 peak.)

Z/Y is preferably 1.5 or more, more preferably 1.7 or more, 2.0 or more, or 2.5 or more, and most preferably 3 or more. The higher the Z/Y value, the higher the durability, which is preferable.

Ru has an hcp structure, and M (Ir, Rh, Pt, Pd, or Au) has an fcc structure. The nanostructure of the present invention contains Ru as its main component and basically has an hcp structure. As the proportion of Ru increases, anisotropic growth is promoted. However, if the proportion of metal M is too small, improved durability cannot be achieved when the nanostructure of the present invention is used as a catalyst for OER. There is an optimal range for the ratio of Ru to metal M (at. %). The nanostructure of the present invention is represented by the formula $Ru_xM_{1-x}$ ($0.6 \leq x \leq 0.999$). The preferred range of x is $0.7 \leq x \leq 0.995$, more preferably $0.8 \leq x \leq 0.995$, still more preferably $0.85 \leq x \leq 0.99$, even more preferably $0.9 \leq x \leq 0.98$, and most preferably $0.92 \leq x \leq 0.97$. Ru and M (Pd, Au) are combinations of metals that do not mix with each other; the nanostructure of the present invention is composed of a solid solution.

The average particle size of the nanostructure of the present invention is about 5 to 500 nm, preferably about 10 to 400 nm, more preferably about 20 to 300 nm, still more preferably about 25 to 250 nm, and most preferably about 30 to 200 nm. When the nanostructure of the present invention has an average particle size of 5 nm or more, and used as a catalyst for OER or HER, the nanostructure is not easily dissolved in a solution in OER or HER reactions under acidic conditions, which improves the durability of the catalyst. When the average particle size is 500 nm or less, the catalytic activity is maintained high. The average particle size (secondary particle size as an aggregate of nanosheets) can be determined by measuring the particle size of 200 or more particles in a TEM image, and taking the arithmetic average.

The nanostructure of the present invention may be supported on a carrier. Specific examples of carriers include, but are not particularly limited to, oxides, nitrides, carbides, elemental carbons, and elemental metals. Of these, oxides and elemental carbons are preferable, and elemental carbons are particularly preferable. When the nanostructure of the present invention is used as an electrode catalyst, the carrier preferably has electrical conductivity, and elemental carbons are preferable.

Examples of the oxides include oxides, such as silica, alumina, ceria, titania, zirconia, and niobia, and composite oxides, such as silica-alumina, titania-zirconia, ceria-zirconia, and strontium titanate. Examples of the elemental carbons include activated carbon, carbon black, graphite, carbon nanotube, and activated carbon fiber. Examples of the nitrides include boron nitride, silicon nitride, gallium nitride, indium nitride, aluminum nitride, zirconium nitride, vanadium nitride, tungsten nitride, molybdenum nitride, titanium nitride, and niobium nitride. Examples of the carbides include silicon carbide, gallium carbide, indium carbide, aluminum carbide, zirconium carbide, vanadium carbide, tungsten carbide, molybdenum carbide, titanium carbide, niobium carbide, and boron carbide. Examples of the elemental metals include pure metals, such as iron, copper, and aluminum, and alloys, such as stainless steel.

The nanostructure of the present invention may be coated with a surface protection agent. Examples of the surface protection agent include polymers, such as polyvinyl pyrrolidone (PVP) and polyethylene glycol (PEG), amines, such as oleylamine, and carboxylic acids, such as oleic acid.

The nanostructure of the present invention is particularly excellent for use as a catalyst for oxygen evolution reactions (OERs) and hydrogen evolution reactions (HERs) under acidic conditions. The nanostructure of the present invention is also suitable for electrolysis under alkaline or seawater conditions. The catalyst is preferably an electrode catalyst.

The nanostructure of the present invention can be produced as follows.

First, a metal compound solution (preferably an aqueous solution) containing an Ru compound and an M compound (at least one member selected from the group consisting of an Ir compound, an Rh compound, a Pt compound, a Pd compound, and an Au compound) and a reducing agent solution are prepared. The reducing agent solution contains a liquid reducing agent, and may further contain a protective agent and water as optional components. It is preferable that the reducing agent solution is heated in advance, and the metal compound solution is added to the heated solution of the reducing agent. The temperature of the reducing agent solution is 205 to 240° C., preferably 210 to 235° C., and more preferably 215 to 230° C. When the temperature of the reducing agent solution is 215 to 230° C., the nanostructure of the present invention is obtained in the largest quantity. If the temperature of the reducing agent solution is less than 205° C., in particular, less than 200° C., the exposure percentage of the 0001 planes of the obtained nanostructure in the total surface area is reduced, resulting in a decrease in durability. When water is incorporated into the reducing agent solution, the amount of water must be adjusted to an extent that the solution can achieve the above temperature. When the reducing agent solution contains a large amount of water, the solution can be used as the reducing agent solution after heating to the above temperature and allowing the water to evaporate so that the solution can maintain the desired temperature. When the liquid reducing agent absorbs moisture in the air, the liquid reducing agent that has absorbed moisture can be used as long as the above temperature (at least 205° C.) can be achieved. Even with a large amount of water, if the reaction can be performed at high pressure in flow synthesis, evaporation is not necessarily performed as long as the temperature can be adjusted to the above temperature. For example, at a pressure of 10 MPa, a mixed solution of 90% water and 10% ethanol may be used.

The metal compound solution is preferably sprayed into the heated reducing agent solution, or added to the reducing agent solution at a constant rate with a syringe or the like. Since the metal compound solution is usually an aqueous solution, the temperature can be, for example, about room temperature (20° C.) to 80° C. The reaction time is about 1 minute to 12 hours, and the reaction is preferably performed with stirring. The concentration of the metal compound solution is preferably about 0.55 $C_0$ to 2 $C_0$ ($C_0$=1 mmol/15 ml). The metal compound solution is added at a rate of preferably about 0.2 $r_0$ to 5 $r_0$ ($r_0$=1 ml/min), and more preferably about 0.5 $r_0$ to 4 $r_0$.

"$C_0$" denotes the total concentration of the Ru compound and M compound. The nanostructure of the present invention can be efficiently produced when the reaction temperature, the concentration of the metal compound solution, and the addition rate are all within the above ranges, and when the Ru content is 60 to 99.9 at. %.

It is preferable that the concentration and the addition rate of the metal compound solution be within the above ranges to increase the yield of the nanostructure of the present invention. If the concentration of the metal compound solution is too low, or the addition rate is too slow, spherical RuM solid solution nanoparticles will be obtained.

After the reaction is completed, cooling and centrifugation are performed to obtain the nanostructure of the present invention, which is a solid solution of Ru and metal M, and which has an anisotropic structure with exposed 0001 planes. The reaction of the liquid reducing agent with the Ru compound and the M compound in the presence of a carrier yields an anisotropic nanostructure in which a solid solution of Ru and M is supported on a carrier.

Examples of the liquid reducing agent include alkylene glycols, such as ethylene glycol and propylene glycol, dialkylene glycols, such as diethylene glycol and dipropylene glycol, trialkylene glycols, such as triethylene glycol and triopropylene glycol, tetraalkylene glycols, such as tetraethylene glycol and tetrapropylene glycol, and polyhydric alcohols, such as glycerin. When the reaction is performed under high pressure, the examples also include monovalent alcohols with a low boiling point, such as methanol, ethanol, propanol, and butanol with a low boiling point.

Examples of the Ru compound and M compound include the following:
Ru compound: [Ru $(NH_3)_6]Cl_3$, [Ru $(C_5H_7O_2)_3$], $K_2[RuCl_5(NO)]$, $K_2$ [$RuCl_6$], $Na_2$ [$RuCl_6$], $(NH_4)_3$ [$RuCl_6$], $RuCl_3$, $RuBr_3$, ruthenium nitrate, ruthenium acetate, etc.
Ir compound: ruthenium halides, such as $IrCl_4$ and $IrBr_4$, $K_2[IrCl_6]$, iridium nitrate, iridium acetylacetonate, iridium potassium cyanide, potassium iridate, etc.
Pd compound: $K_2PdCl_4$, $Na_2PdCl_4$, $K_2PdBr_4$, $Na_2PdBr_4$, palladium nitrate, etc.
Rh compound: rhodium acetate, rhodium nitrate, rhodium chloride, etc.
Pt compound: $K_2PtCl_4$, $(NH_4)_2K_2PtCl_4$, $(NH_4)_2PtCl_6$, $Na_2PtCl_6$, bis(acetylacetonato)platinum (II), etc.
Au compound: $HAuCl_4$, $HAuBr_4$, $K_2AuCl_6$, $Na_2AuCl_6$, gold acetate, etc.

The concentration of the Ru compound and the concentration of the M compound in the solvent solution are each about 0.01 to 1000 mmol/L, preferably about 0.05 to 100 mmol/L, and more preferably about 0.1 to 50 mmol/L. When each concentration of the Ru compound and M compound is about 0.01 to 1000 mmol/L, the uniformity of Ru and M is maintained at the atomic level.

EXAMPLES

The present invention is described in more detail below with reference to the Examples. However, the present invention is, of course, not limited to these Examples.

In the Examples, the following devices were used.
(i) Powder X-ray diffraction (PXRD) Rigaku Miniflex 600 (Cu Kα)
(ii) Transmission electron microscope (TEM) Hitachi HT7700 (accelerating voltage: 100 kV)
(iii) High-angle annular dark-field scanning transmission electron microscopy (HAADF-STEM) JEOL JEM-ARM200F (accelerating voltage: 200 kV)
(iv) X-ray photoelectron spectroscopy (XPS) Shimadzu ECSA-3400 (The data were calibrated by carbon is signal.)
(v) Electrocatalytic process ALS CHI electrochemical analyzer Model 760E Rotating Ring Disk Electrode RRDE-3A (ALS Japan (BAS))

Comparative Example 1

Figure 1:
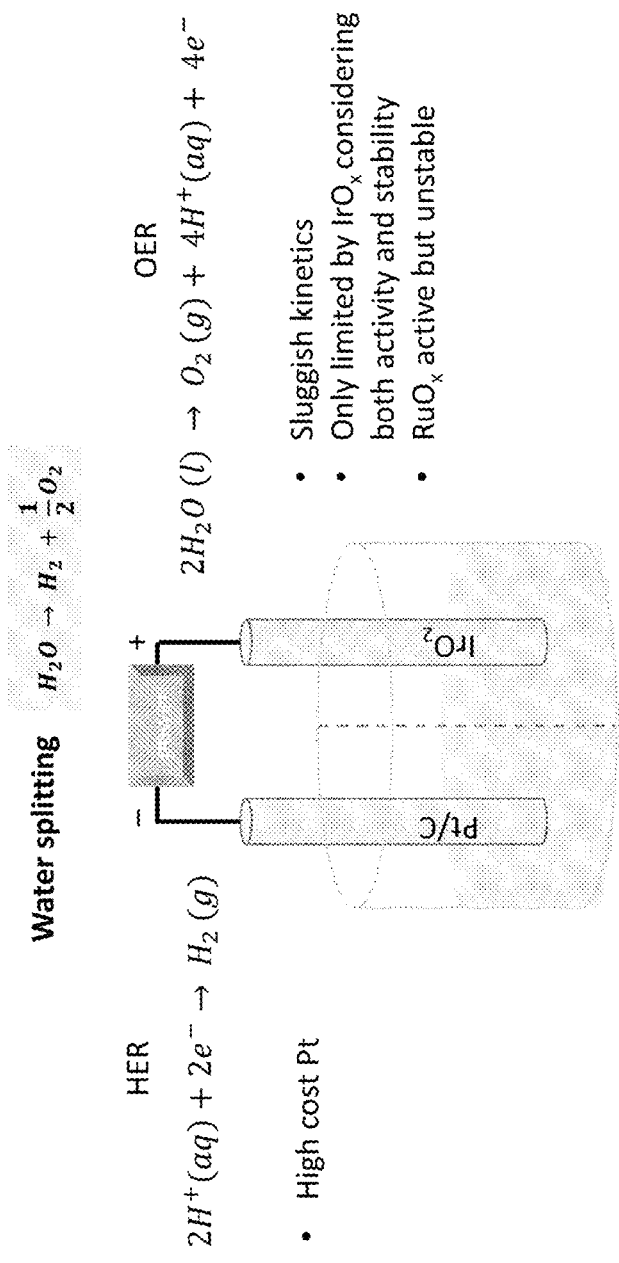
FIG. 1 shows HER and OER in the electrolysis of water.
Figure 2:
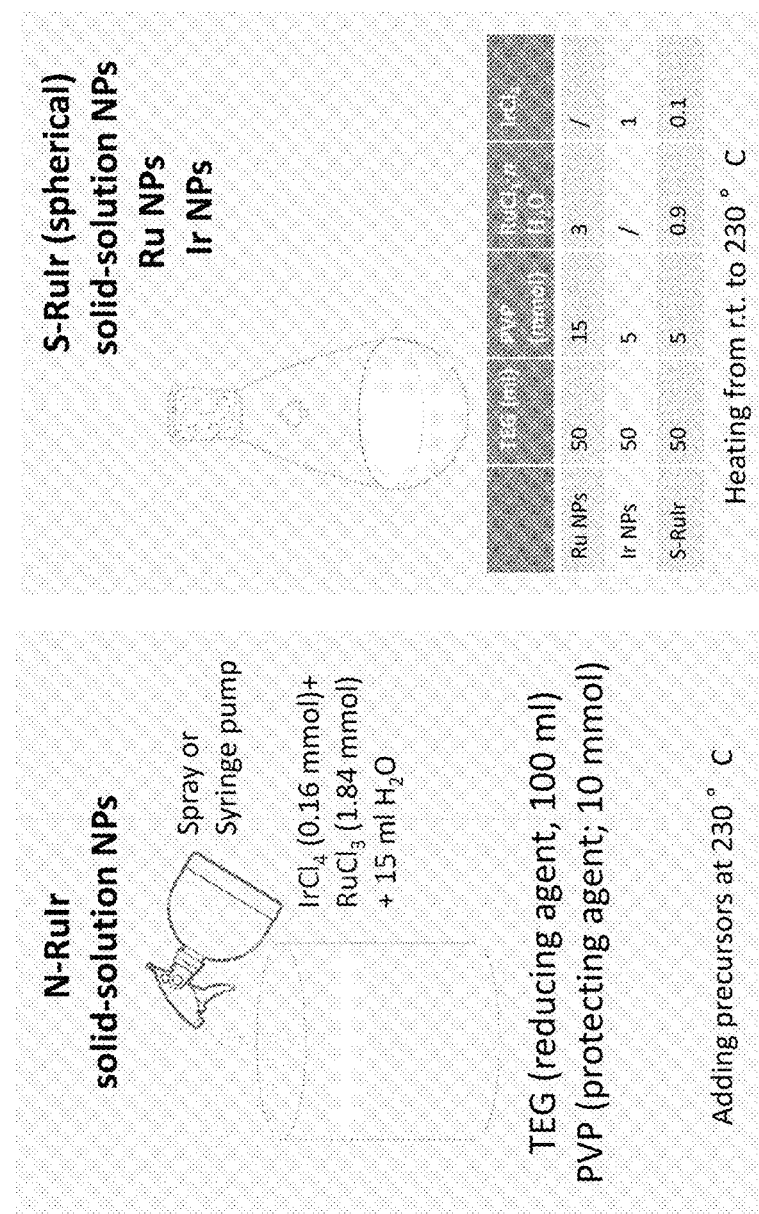
FIG. 2 shows methods for producing an anisotropic nanostructure of the present invention (N—RuIr) and conventional isotropic nanoparticles (S—RuIr, Ru, and Ir) in Examples.
Figure 3:
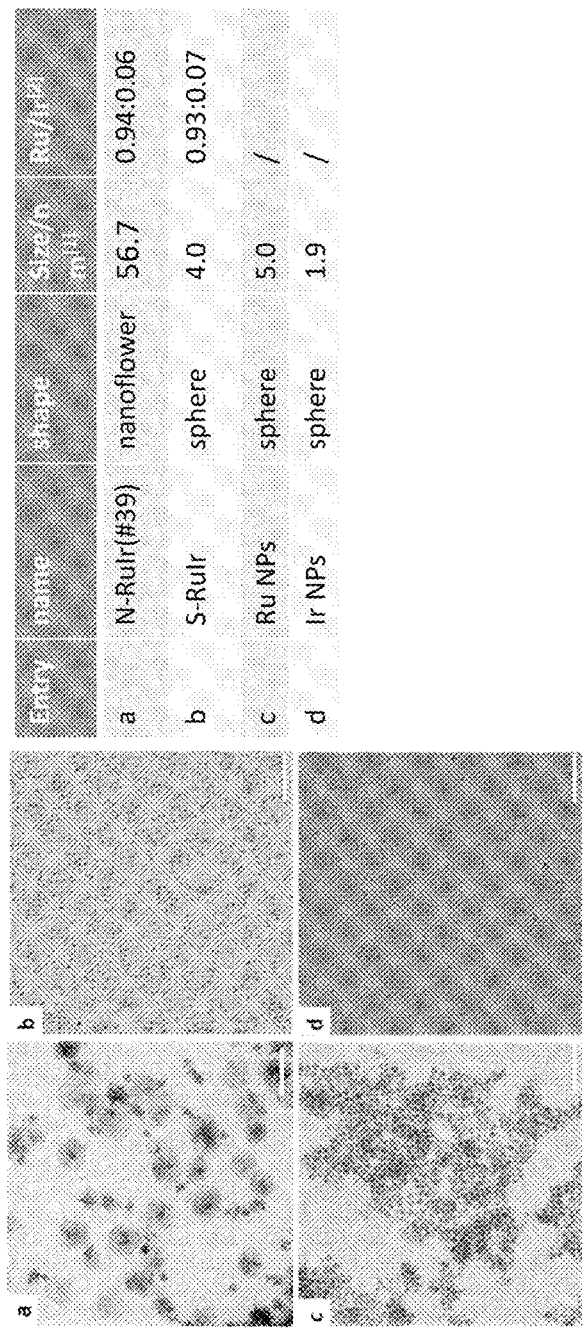
FIG. 3 shows TEM images, the shape, size, and Ru/Ir ratio of the anisotropic nanostructure of the present invention (N—RuIr, #39), isotropic nanoparticles (S—RuIr), Ru nanoparticles (Ru NPs), and Ir nanoparticles (Ir NPs). N—RuIr has a uniform nanoflower-like structure, while S—RuIr, Ru NPs, and Ir NPs have a sphere-like shape. The ratios of Ru to Ir obtained by XRF analysis are similar for N—RuIr and S—RuIr. Scale bar: 100 nm. In the table shown in FIG. 3, (1) the average size was obtained by counting at least 200 NPs, and (2) the atomic ratio was obtained by XRF.

Tetraethylene glycol (TEG) (50 ml), PVP (5 mmol), $IrCl_4$ (0.1 mmol), $RuCl_3 \cdot nH_2O$ (0.9 mmol) were placed in a 100-ml eggplant flask at room temperature, and the mixture was heated to 230° C. in an oil bath under stirring, followed by reaction for 3 hours. The resulting reaction liquid was centrifuged to obtain precipitated spherical RuIr solid solution nanoparticles (Ru:Ir=93:7, particle size=4.0 nm). Below, the obtained nanoparticles are abbreviated as "S—RuIr." FIG. 3 shows the TEM images and the X-ray fluorescence (XRF) analysis results of the obtained S—RuIr. Ru nanoparticles and Ir nanoparticles were produced in the same manner as above. However, for the metal salt, $RuCl_3 \cdot nH_2O$ (3.0 mmol) was used for the Ru nanoparticles, and $IrCl_4$ (1.0 mmol) was used for the Ir nanoparticles. FIG. 3 shows the TEM images and the XRF results of the obtained nanoparticles (Ir NPs and Ru NPs).

Example 1

TEG (100 ml) and PVP (10 mmol) were placed in a 200-ml beaker, and the mixture was heated to 230° C. in an oil bath under stirring. A solution obtained by dissolving $IrCl_4$ (0.16 mmol) and $RuCl_3$-$nH_2O$ (1.84 mmol) in 15 ml of water (total concentration: 2 $C_0$, $C_0$=1 mmol/15 ml) was injected at a rate of 0.5 $r_0$ ($r_0$=1.00 ml/min) into the above TEG- and PVP-containing solution heated to 230° C. with an injection device (product name: KDS200 syringe pump, produced by KD Scientific) under stirring, followed by reaction for 30 min. The resulting reaction solution was centrifuged, thereby obtaining a precipitated RuIr nanostructure as a solid solution (Ru:Ir=94:6) (#39). Below, the obtained nanostructure is abbreviated as "N—RuIr." FIG. 3 shows the TEM images and the XRF results of the obtained N—RuIr.

Test Example 1

Figure 4:
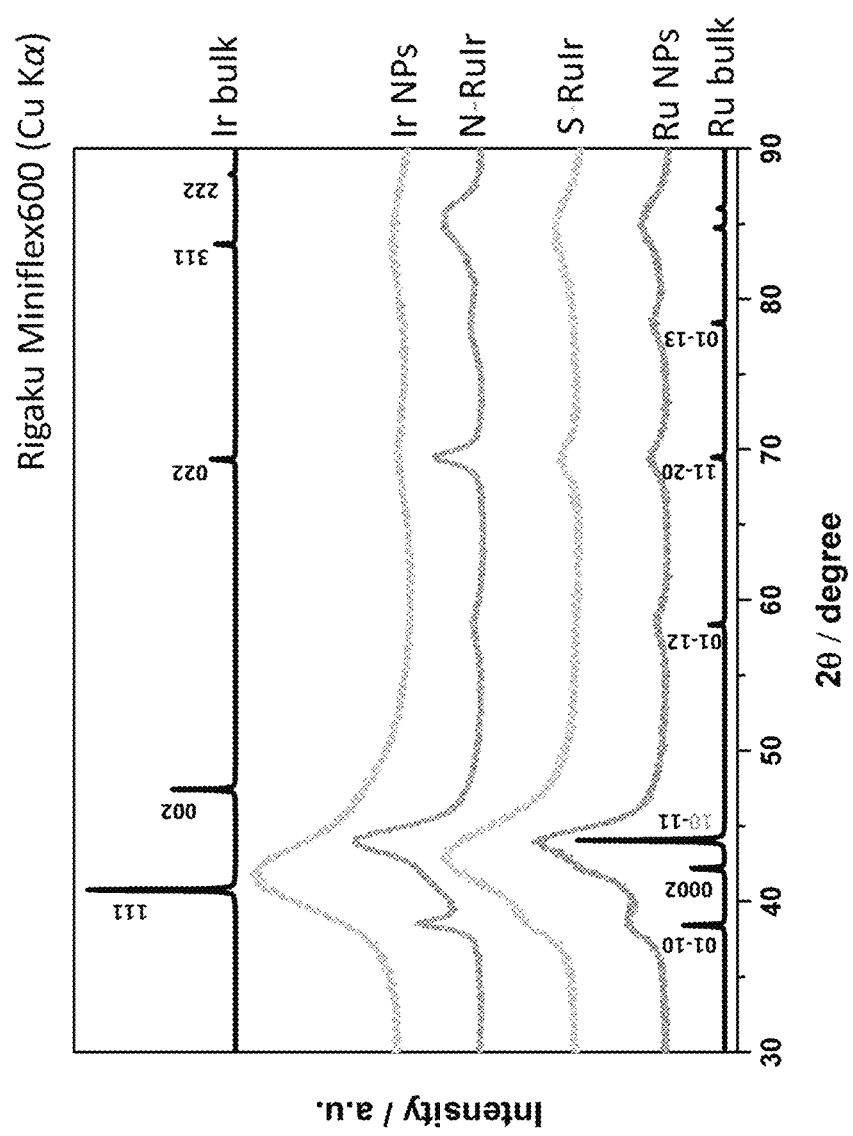
FIG. 4 shows powder X-ray diffraction (PXRD) patterns of N—RuIr, S—RuIr, Ru NPs, and Ir NPs. Like Ru NPs and Ru bulk, N—RuIr and S—RuIr have a hexagonal close-packed (hcp) structure. N—RuIr has large crystallite sizes of (01-10) (13.5 nm) and (11-20) (11.5 nm) from its specific diffraction peaks, which are different from the crystallite sizes (2 nm or less) of other peaks. This suggests that N—RuIr has an anisotropic structure.

FIG. 4 shows the PXRD results of N—RuIr obtained in Example 1 and S—RuIr obtained in Comparative Example 1, as well as Ru NPs, Ir NPs, Ru bulk, and Ir bulk.

Figure 5:
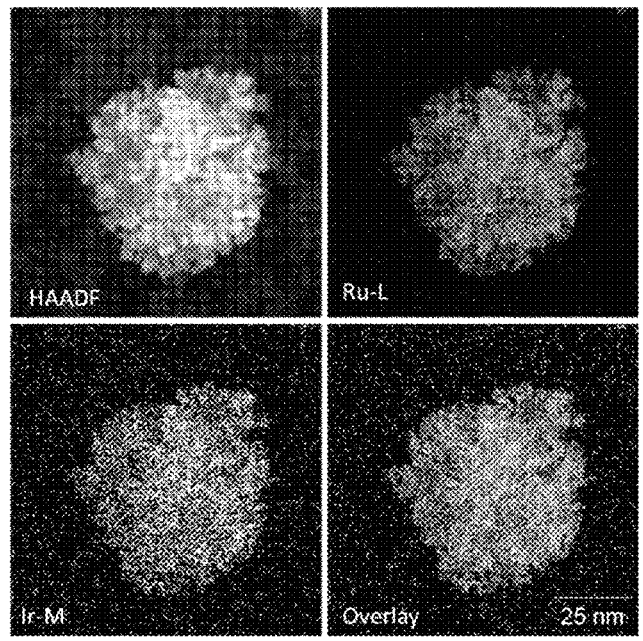
FIG. 5 is HAADF-STEM and EDX mapping images of N—RuIr. RuIr has a nanocoral (NC)-like structure. Ru and Ir are uniformly distributed in the structure, suggesting that it is a solid solution.

FIG. 5 shows the HAADF-STEM and EDX mapping images of N—RuIr obtained in Example 1.

FIGS. 6A to 6C show the HAADF-STEM images of N—RuIr obtained in Example 1.

Figure 7:
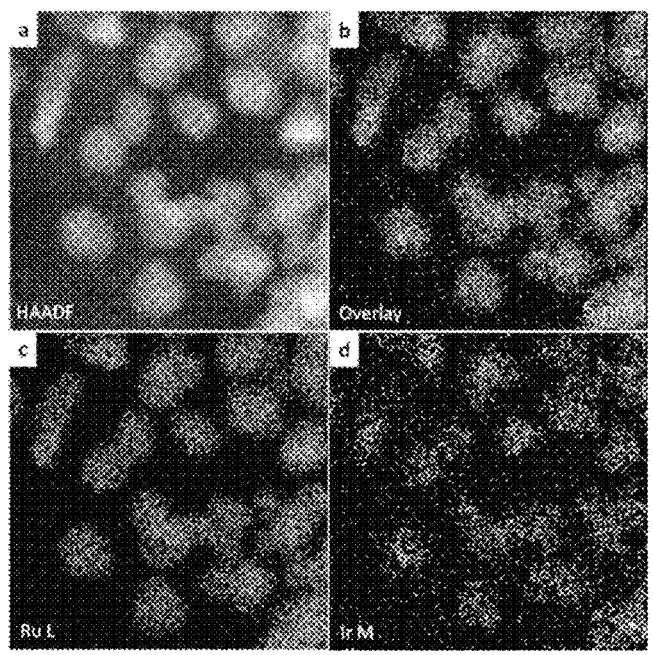
FIG. 7 is STEM-EDX mapping images of S—RuIr. (a): HAADF, (b): overlay, (c): Ru L, and (d): Ir M. S—RuIr is confirmed to have a solid solution structure as in N—RuIr.

FIG. 7 shows the HAADF-STEM and EDX mapping images of S—RuIr obtained in Comparative Example 1.

FIG. 19 shows 3D tomographic images reconstructed from HAADF-STEM images of N—RuIr obtained in Example 1 taken from various angles.

FIG. 11 shows the PXRD results of N—RuIr obtained in Example 1 and S—RuIr obtained in Comparative Example 1.

The PXRD was measured at SPring-8 BL02B2 ($\lambda$=0.58 Å) using Bruker D8 Advance (Cu K$\alpha$; $\lambda$=1.54 Å).

Test Example 2

Production of Electrode Catalyst A RuIr nanostructured catalyst in which N—RuIr obtained in Example 1 was supported on carbon particles (RuIr/C, metal content: 20 wt %) was produced. Further, a RuIr solid solution particle catalyst in which S—RuIr obtained in Comparative Example 1 was supported on carbon particles (RuIr/C, metal content: 20 wt %) was produced. Additionally, catalysts in which Ru NPs, Ir NPs, $IrO_2$ (produced by Sigma-Aldrich), or $RuO_2$ (produced by Wako Pure Chemical Industries, Ltd.) was supported, instead of N—RuIr, on carbon particles were produced, together with Pt/C (produced by Johnson Matthey) (Ru/C, Ir/C, $IrO_2$/C, $RuO_2$/C, and Pt/C, each metal content: 20 wt %). Each of the obtained catalysts was applied in an amount of 0.01 mg to a rotating disk electrode (p 5.00 mm, 0.196 cm$^{-2}$) to evaluate the catalysts.

Figure 8:
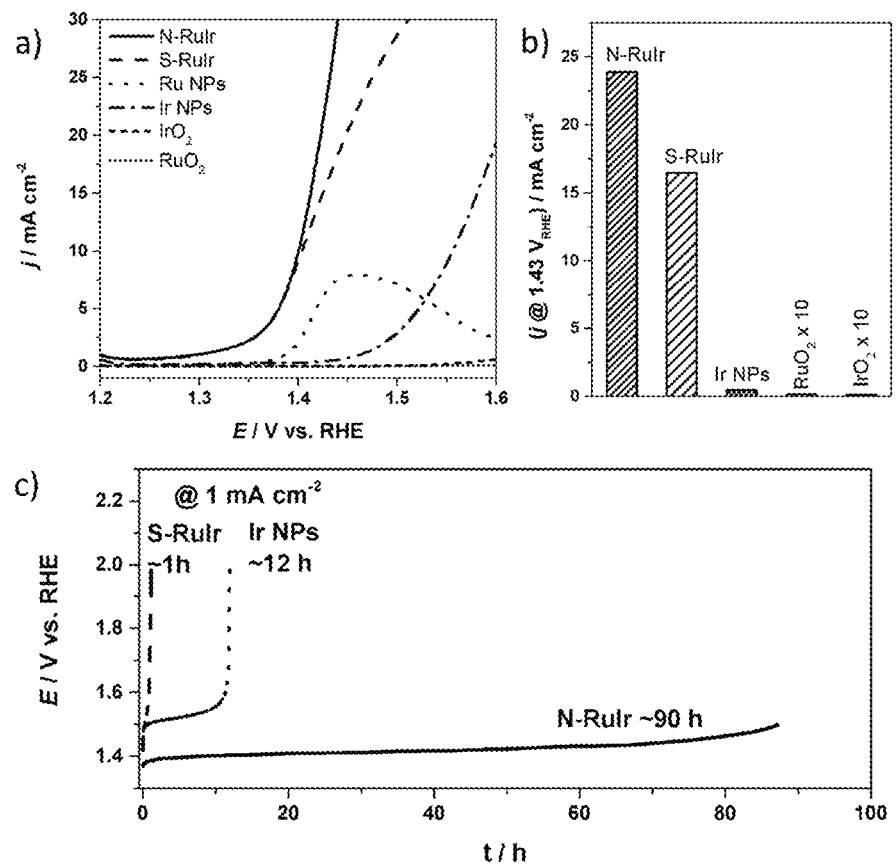
FIG. 8 is graphs showing the OER activity and stability in an acidic aqueous solution. (a): OER polarization curves, (b): current density at 1.43 $V_{RHE}$, and (c): chronopotentiometry curves at a current density of 1 mA/cm$^2$. Test conditions: Ar-purged 0.05 M H$_2$SO$_4$ solution, 1600 rpm, 5 mV/s. IrO$_2$ and RuO$_2$ were purchased from Sigma-Aldrich and Wako Pure Chemical Industries, Ltd., respectively. (a, b) N—RuIr shows the highest activity with an overpotential of 170 mV to achieve 10 mA cm$^{-2}$. (c) N—RuIr shows high stability. There is no obvious change in the potential even around 90 h.
Figure 9:
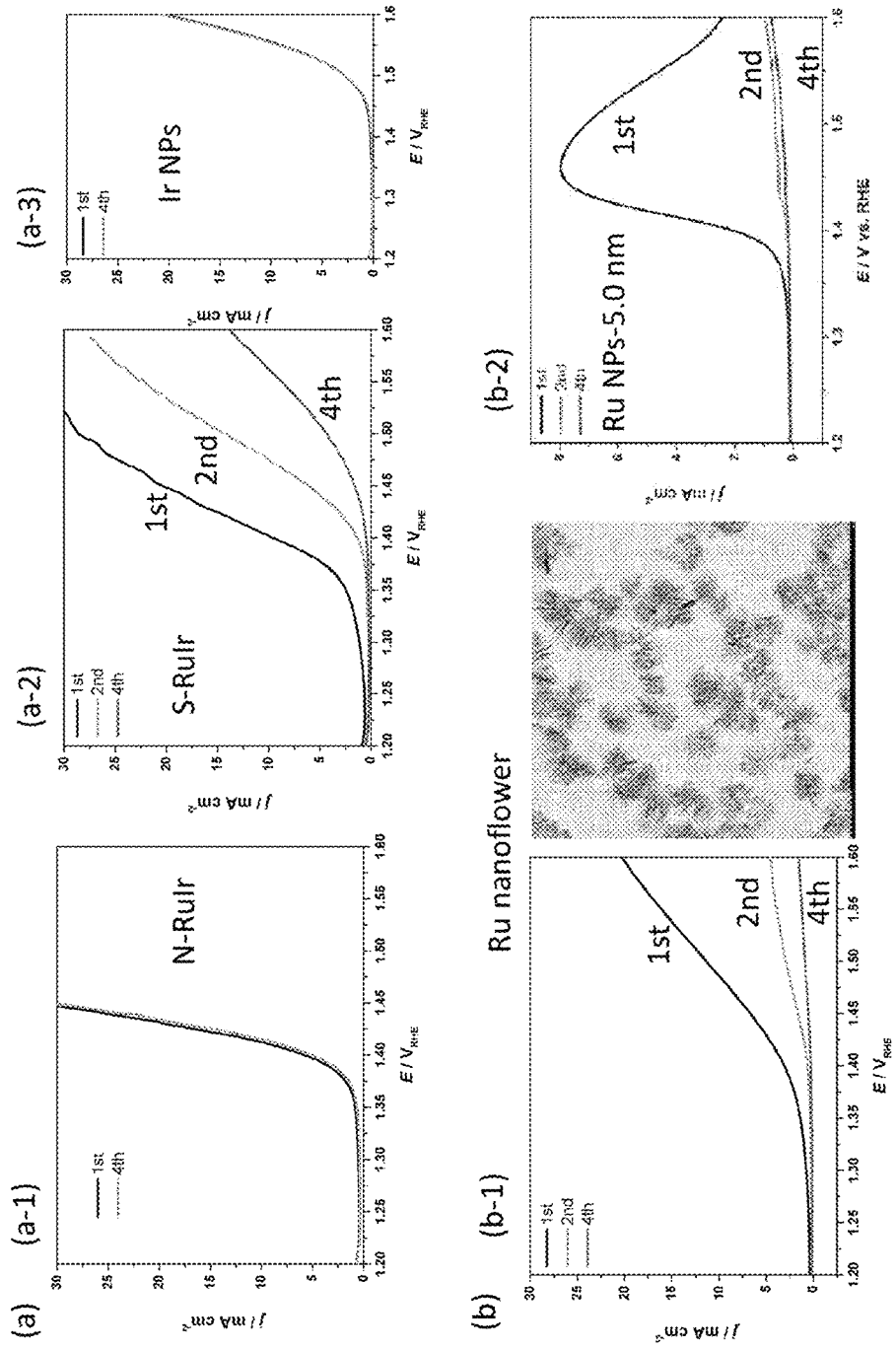
FIG. 9 shows OER polarization curves of the first, second, and fourth measurements.

Oxygen Evolution Reaction (OER) Catalytic Activity Current measuring device: Potentiostat (ALS760E, produced by BAS) Measurement method: The rotating ring-disk electrode in which N—RuIr of Example 1 was supported on carbon was used as an anode. Further, a three-electrode cell (counter electrode: platinum wire; reference electrode: silver-silver chloride (Ag/AgCl); electrolyte: 0.05M $H_2SO_4$ aqueous solution, 25° C., Ar-purge, 1600 rpm) was used to measure a current value I when a potential E was swept from 1 V to 2.0 V (vs. RHE) at 5 mV/s. For comparison, the OER catalytic activity was measured in a manner similar to the above using S—RuIr, Ru nanoparticles (Ru NPs), Ir nanoparticles (Ir NPs), iridium oxide ($IrO_2$), and ruthenium oxide ($RuO_2$) as the electrode material instead of N—RuIr. FIG. 8 shows the results. Additionally, the current density at 1.43 $V_{RHE}$ (FIG. 8B) and the chronopotentiometry curve at a current density of 1 mA/cm$^2$ (FIG. 8C) were measured. The OER polarization curves were measured repeatedly. FIG. 9 shows the results of the first (1st), second (2nd), and fourth (4th) measurements. FIG. 8A (a) and (b) show that the RuIr nanostructured catalyst of the present invention exhibits higher activity than the RuIr nanoparticle catalyst of the same metal composition, the Ru nanoparticle catalyst, Ir nanoparticle catalyst, $IrO_2$, or $RuO_2$ catalyst. It was clarified that the RuIr nanostructured catalyst achieves a current density of 10 mA/cm$^{-2}$ at an overpotential of only 170 m. FIG. 8 (c) reveals that the RuIr nanostructured catalyst exhibits a much higher durability than the RuIr nanoparticle catalyst of the same metal composition or the Ir nanoparticle catalyst. As is seen in FIG. 9 (a), the RuIr nanostructured catalyst showed no decrease in catalytic activity in repeated activity evaluations, whereas the RuIr nanoparticle catalyst of the same metal composition already shows a decrease in activity in the second evaluation. FIG. 9 (b) compares the Ru nanostructured catalyst and Ru nanoparticle catalyst. Although the Ru nanostructured catalyst exhibits a higher durability than the Ru nanoparticles, its activity already decreases in the second evaluation. The results shown in FIG. 9 indicate that the high durability of the RuIr nanostructured catalyst of the present invention is based on two effects: the specific nanostructure and the alloy (solid solution).

Hydrogen evolution reaction (HER) catalytic activity Current measuring device: Potentiostat (ALS760E, produced by BAS) Measurement method: The rotating ring-disk electrode in which N—RuIr of Example 1 was supported on carbon particles was used as a cathode. Further, a three-electrode cell (counter electrode: platinum wire; reference electrode: mercury-mercury oxide electrode (Hg/HgO); electrolyte: 0.05 M $H_2SO4$ aqueous solution, 25° C., Ar-purge, 1600 rpm) was used to measure a current value I when a potential E was swept from −1 V to 0.1 V (vs. RHE) at 5 mV/s to evaluate the HER catalytic activity. For comparison, the HER catalytic activity was measured using S—RuIr, Ru nanoparticles (Ru NPs), Ir nanoparticles (Ir NPs), and platinum nanoparticles (Pt NPs) as the electrode material instead of N—RuIr in a manner similar to the above. FIG. 10 shows the results. The results revealed that the RuIr nanostructured catalyst of the present invention shows a higher activity than the other catalysts, and also has a higher activity than the commercially available Pt catalyst.

Example 2

N—RuIr was obtained as in Example 1 except that the concentrations of $IrCl_4$ and $RuCl_3$ were set to 0.55 $C_0$ (#38), 1.00 $C_0$ (#42), and 2.00 $C_0$ (#33), and the injection rate was set to 1.0 $r_0$ ($r_0$=1.00 ml/min). FIG. 12 shows the TEM images and the PXRD and XRF results of the obtained N—RuIr. The results revealed that a higher metal salt concentration further promotes the anisotropic growth.

Example 3

N—RuIr was obtained as in Example 1 except that the temperature of the heated solution containing TEG and PVP was set to 200° C. (#41), 215° C. (#40), 230° C. (#33), and 245° C. (#34), and the injection rate was set to 1.0 $r_0$ ($r_0$=1.00 ml/min). FIG. 13 shows the TEM images and the PXRD and XRF results of the obtained N—RuIr. The results revealed that the temperature of the heated solution in the range of 215° C. to 230° C. further promoted the anisotropic growth.

Example 4

N—RuIr was obtained as in Example 1 except that the injection rate of the solution containing $IrCl_4$ and $RuCl_3$ was set to 0.2 $r_0$ (#36), 4 $r_0$ (#37), and 5 $r_0$ (#23). FIG. 14 shows the TEM images and the PXRD and XRF results of the obtained N—RuIr. The results revealed that the injection rate of 0.5 $r_0$ to 5 $r_0$ further promoted the anisotropic growth, and that a faster rate caused smaller crystalline sizes.

Example 5

N—RuIr was obtained as in Example 1 except that the synthesis conditions were set to $RuCl_3$: 0.7 mmol, $IrCl_4$: 0.3 mmol, and $H_2O$: 15 ml (#6); $RuCl_3$: 0.65 mmol, $IrCl_4$: 0.35 mmol, and $H_2O$: 15 ml (#5); $RuCl_3$: 0.60 mmol, $IrCl_4$: 0.40 mmol, and $H_2O$: 15 ml (#24); and $RuCl_3$: 0.59 mmol, $IrCl_4$: 0.41 mmol, and $H_2O$: 15 ml (#25). FIGS. 15 and 16 show the TEM images and the XRF and PXRD results of the obtained N—RuIr.

Comparative Example 2

Spherical RuIr solid solution nanoparticles were obtained as in Example 1 except that the synthesis conditions were set to $RuCl_3$: 0.50 mmol, $IrCl_4$: 0.50 mmol, and $H_2O$: 15 ml (#27). FIGS. 15 and 16 show the TEM images and the XRF and PXRD results of the obtained RuIr solid solution nanoparticles. Even under the production conditions of Example 1, spherical RuIr solid solution nanoparticles were obtained when the Ir content exceeded 40 at. % (47 at. %). This clarified that the Ru content of 60 to 99.9 at. %, in addition to the temperature of the reducing agent solution, the concentration of the metal compound, and the rate of addition, are important factors for the production of the nanostructure of the present invention.

Examples 6 and 7

N—RuPd (Example 6) and N—RuPt (Example 7) were obtained as in Example 1 except that the synthesis conditions were set to be $RuCl_3$: 1.90 mmol, $K_2PdCl_4$: 0.10 mmol, and $H_2O$: 15 ml (Example 6) and $RuCl_3$: 1.90 mmol, $K_2PtCl_4$: 0.10 mmol, and $H_2O$: 15 ml (Example 7). FIGS. 17 and 18 show the TEM images, the PXRD results, the size of the 10-11 plane, the size of the 11-20 plane, and the ratio (11-20/10-11) of the obtained N—RuPd and N—RuPt.

Examples 8 and 9

N—RuRh (Example 8) and N—RuAu (Example 9) were obtained as in Example 1, except that the synthesis conditions were set to be $RuCl_3$: 1.90 mmol, rhodium acetate: 0.10 mmol, $H_2O$: 15 ml (Example 8) and $RuCl_3$: 1.90 mmol, $HAuCl_4$: 0.10 mmol, $H_2O$: 15 ml (Example 9). FIGS. 17 and 18 show the TEM images, the PXRD results, the size of the 10-11 plane, the size of the 11-20 plane, and the ratio (11-20/10-11) of the obtained N—RuRh and N—RuAu.

Example 10

The crystallite sizes of the 10-11 plane and the 11-20 plane of N—RuPd (Example 6), N—RuIr (Example 1), and comparative RuPd (nanoparticles), which was obtained by reaction at 200° C. for 15 minutes in accordance with the Examples of PTL 2, were calculated from XRD. Based on the obtained results, the sheet thickness was estimated. Specifically, as shown in FIG. 20, a disk sheet was assumed supposing that the crystallite size of the 11-20 (in-plane direction) obtained from XRD was the average sheet size. Then, from the similarity relationship, the thickness of the disk sheet was calculated to be $\sqrt{(9/32)} \approx 0.53$ times that of the 10-11. Then, the estimated total surface area, the area of the 0001 planes, and the exposure percentage of the 0001 planes in the total surface area were calculated. The 10-11 and the 01-11 in FIG. 20 are equivalent planes. Table 1 shows the results. The results revealed that the RuPd or RuIr nanostructures of the present invention had a high exposure percentage of the 0001 plane in the total surface area of 79.7% and 74.1%, respectively, which caused high durability. However, the comparative RuPd nanoparticles produced according to the Examples of PTL 2 had a low exposure percentage of the 0001 planes in the total surface area of 53.5%, which caused poor durability. Table 1 below shows the crystallite sizes (Y) calculated from the 10-11 peak and the crystallite size (Z) calculated from the 11-20 peak, as well as the ratio (Z/Y) of RuPd NCs, RuIr NCs, and the comparative RuPd nanoparticles.

TABLE 1

| | Crystallite size | | | | | | |
|---|---|---|---|---|---|---|---|
| | 10-11 (nm) (Y; XRD) | Sheet thickness (nm) | 11-20 (nm) (Z; XRD, sheet diameter) | Surface area (nm$^2$) | Area of 0001 planes (nm$^2$) | Exposure percentage of 0001 planes in the total surface area (%) | Z/Y |
| N-RuPd | 2.9 | 1.5 | 11.8 | 274.3 | 218.7 | 79.7 | 4.07 |
| N-RuIR | 2.8 | 1.5 | 8.6 | 156.7 | 116.2 | 74.1 | 3.07 |
| Comparative RuPd | 6.9 | 3.7 | 8.6 | 212.3 | 113.5 | 53.5 | 1.23 |

Example 11

The HER catalytic activity of N—RuPd, N—RuPt, N—RuRh, and N—RuAu obtained in Examples 6 to 9, as well as Ru NPs (Ru nanoparticles), was determined in the same manner as in Test Example 2. FIG. 21 shows the results. The results clarified that N—RuPd, N—RuPt, N—RuRh, and N—RuAu, which were obtained by adding about 5% of a second metal, had a higher HER catalytic activity than that of the Ru NPs (Ru nanoparticles).

Example 12

According to the production method of Example 1, N—RuIr with 7 at. % of Ir, 20 at. % of Ir, or 30 at. % of Ir was synthesized by changing the ratio of $IrCl_4$ to $RuCl_3 \cdot nH_2O$ as shown in FIG. 22 under the experimental conditions shown in FIG. 22 without using a protective agent (PVP). FIG. 23 shows the XRD patterns and crystallite size analysis results of the obtained N—RuIr, and FIG. 24 shows the TEM images. Further, the OER activity and stability in an acidic aqueous solution were evaluated. FIG. 25 shows the results.

Example 13

According to the production method of Example 1, Sample 1 and Sample 2 of N—RuIr were synthesized under the experimental conditions shown in FIG. 26 by changing the concentrations of $IrCl_4$ and $RuCl_3 \cdot nH_2O$ as shown in FIG. 26. FIG. 27 shows the XRD patterns, TEM images, and crystallite size analysis results of Samples 1 and 2. The OER activity and stability in an acidic aqueous solution were evaluated. FIG. 28 shows the results.

The invention claimed is:

1. An anisotropic nanostructure represented by the formula:

$$Ru_xM_{1-x},$$

wherein $0.6 \leq x \leq 0.999$, and M represents at least one member selected from the group consisting of Ir, Rh, Pt, Pd, and Au, and
  wherein Ru and M form a solid solution at the atomic level, and the anisotropic nanostructure has an anisotropic hexagonal close-packed structure (hcp), and
  wherein the anisotropic nanostructure is composed of a particle represented by the formula $$Ru_xM_1-x.$$

2. The anisotropic nanostructure according to claim 1, having a two-dimensional sheet structure comprising a stack of nanosheets or nanoplates with 0001 planes exposed as a main plane.

3. The anisotropic nanostructure according to claim 1, wherein the anisotropic nanostructure having an anisotropic hexagonal close-packed structure satisfies the relationship of Formula (I):

$$Z/Y \geq 1.5 \qquad (I),$$

wherein Y represents a crystallite size calculated from a (1011) peak in an X-ray diffraction pattern, and Z represents a crystallite size calculated from a (1120) peak in the X-ray diffraction pattern.

4. The anisotropic nanostructure according to claim 3, wherein the anisotropic nanostructure having an anisotropic hexagonal close-packed structure satisfies the relationship of Formula (Ia):

$$Z/Y \geq 2.5 \qquad (Ia),$$

wherein Y represents a crystallite size calculated from a (1011) peak in an X-ray diffraction pattern, and Z represents a crystallite size calculated from a (1120) peak in the X-ray diffraction pattern.

5. The anisotropic nanostructure according to claim 3, wherein the anisotropic nanostructure having an anisotropic hexagonal close-packed structure satisfies the relationship of Formula (Ib):

$$Z/Y \geq 3 \qquad (Ib),$$

wherein Y represents a crystallite size calculated from a (1011) peak in an X-ray diffraction pattern, and Z represents a crystallite size calculated from a (1120) peak in the X-ray diffraction pattern.

6. The anisotropic nanostructure according to claim 1, wherein the exposure percentage of the 0001 planes in the total surface area is 60 to 99%.

7. The anisotropic nanostructure according to claim 1, wherein the nanosheets or nanoplates constituting the anisotropic nanostructure and having the 0001 planes exposed as the main plane have a thickness of 0.2 to 20 nm.

8. The anisotropic nanostructure according to claim 1, wherein M is Ir.

9. The anisotropic nanostructure according to claim 1, wherein $0.8 \leq x \leq 0.995$.

10. A catalyst having the nanostructure of claim 1.

11. The catalyst according to claim 10, which is an electrode catalyst for oxygen evolution reactions (OERs) or hydrogen evolution reactions (HERs).

12. A method for producing the anisotropic nanostructure of claim 1, comprising adding a solution containing an Ru compound and an M compound to a solution containing a reducing agent and having a temperature of 215 to 230° C.

13. The method for producing the anisotropic nanostructure according to claim 12, wherein the solution has a total concentration of the Ru compound and the M compound of 0.55 $C_0$ to 2 $C_0$, wherein $C_0$=1 mmol/15 ml.

14. The method for producing the anisotropic nanostructure according to claim 12, wherein the solution containing the Ru compound and the M compound is added at a rate of 0.5 $r_0$ to 5 $r_0$, wherein $r_0$=1 ml/min.

15. The anisotropic nanostructure according to claim 1, having
  a crystal structure having a length in the in-plane direction of the 0001 planes of 5 nm or more,
  a crystal structure having a length in the out-plane direction of the 0001 planes of 5 nm or less, and
  a ratio of the lengths of the crystal structure in the in-plane direction and the out-plane direction of the 0001 planes (the length of the crystal in the in-plane direction of the 0001 planes to the length of the crystal in the out-plane direction of the 0001 planes) of 1.5 to 50.

16. The anisotropic nanostructure according to claim 1, wherein the anisotropic nanostructure consists essentially of the anisotropic hexagonal close-packed structure (hcp).

17. The anisotropic nanostructure according to claim 1, wherein the anisotropic nanostructure consists of the anisotropic hexagonal close-packed structure (hcp).

* * * * *